United States Patent
Miller et al.

(10) Patent No.: US 10,738,151 B2
(45) Date of Patent: Aug. 11, 2020

(54) BIORENEWABLE, WATER-DEGRADABLE POLYMERS AND CO-POLYMERS

(71) Applicant: University of Florida Research Foundation, Inc., Gainesville, FL (US)

(72) Inventors: Stephen Albert Miller, Gainesville, FL (US); Pengxu Qi, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 45 days.

(21) Appl. No.: 16/017,076

(22) Filed: Jun. 25, 2018

(65) Prior Publication Data

US 2019/0023839 A1  Jan. 24, 2019

Related U.S. Application Data

(60) Provisional application No. 62/524,227, filed on Jun. 23, 2017.

(51) Int. Cl.
*C08G 63/68* (2006.01)
*C08G 63/685* (2006.01)

(52) U.S. Cl.
CPC ..... *C08G 63/6856* (2013.01); *C08G 63/6852* (2013.01); *C08G 2230/00* (2013.01)

(58) Field of Classification Search
CPC ............ C08G 63/6856; C08G 63/6852; C08G 2230/00
See application file for complete search history.

(56) References Cited

U.S. PATENT DOCUMENTS 5,142,023 A   8/1992  Gruber et al.

FOREIGN PATENT DOCUMENTS

EP         0288263       10/1988

OTHER PUBLICATIONS

Chanda, S., et al.; Polymer Chemistry, 2015, vol. 6, p. 2108-2114.*
Kaneko, T.; Scientific Research Grant Program Research Report: 1-5, 2015, p. 1-6; machine translation.*
Ahmed J, et al, "Polylactides—chemistry, properties and green packaging technology: a review", Int. J. Food Properties, vol. 14, pp. 37-58 (2011).
Ali M, et al, "Syntheses of High-Performance Biopolyamides Derived from Itaconic Acid and their environmental corrosion", Macromolecules, vol. 46, pp. 3719-3725 (2013).
Andrady A, "Applications and societal benefits of plastics", Phil Trans R Soc B, vol. 364, pp. 1977-1984 (2009).
Andrady A, et al, "Microplastics in the marine environment", Marine Pollution Bulletin, vol. 62, pp. 1596-1605 (2011).
Arrighi V, et al, "Dielectric Relaxations in Poly(di-n-alkyl itaconate)s", Macromolecules, vol. 37, pp. 6210-6218 (2004).
Avantium, "Products & Applications", FDCA, pp. 1-8, https://www.avantium.com/yxy/products-applications/#fdca (2016).
Avantium, "YXY Technology", FDCA, pp. 1-5, https://www.avantium.com/yxy/yxy-technology/ (2016).
Averesch N, et al, "Production of para-aminobenzoic acid from different carbon-sources in engineered *Saccharomyces cerevisiae*", Microb Cell Fact, vol. 15, pp. 1-16 (2016).
Babu R, et al, "Current progress on bio-based polymers and their future trends", Progress in Biomaterials, vol. 2, pp. 1-16 (2013).
Barnes D, et al, "Accumulation and fragmentation of plastic debris in global environments", Phil Trans R Soc B, vol. 364, pp. 1985-1998 (2009).
Barrett D, et al, "One-step syntheses of photocurable polyesters based on a renewable resource", Macromolecules, vol. 43, pp. 9660-9667 (2010).
Becker J, et al, "Synthesis of Poly(lactide)s with modified thermal and mechanical properties", Macromolecular rapit communications, vol. 31, pp. 1923-1937 (2010).
Brandrup J, et al, "Polymer Handbook: Fourth Edition", Wiley-Interscience, pp. 1-55 (1999).
Braus G, "Aromatic Amino Acid Biosynthesis in the yeast *Saccharomyces cerevisiae*: a model system for the regulation of eukaryotic biosynthetic pathway", Microbiological reviews, vol. 55, Issue 3, pp. 349-370 (1991).
Burgess S, et al, "Chain mobility, thermal, and mechanical properties of poly(ethylene furanoate) compared to poly(ethylene terephthalate)", Macromolecules, vol. 47, pp. 1383-1391 (2014).
Cameron D, et al, "Aliphatic polyester polymer stars: synthesis, properties and applications in biomedicine and nanotechnology", Chemical Society Reviews, vol. 40, pp. 1761-1776 (2011).
Common Wealth of Australia, "Toxic Tide: the threat of marine plastic pollution in Australia", Environment and Comm References Committee, pp. 1-181 (2016).
Dalev P, "Utilisation of waste feathers from poultry slaughter for production of protein concentrate", Bioresource Technology, vol. 48, pp. 265-267 (1994).
Dodds D & Gross R, "Chemicals from biomass", Science, vol. 318, pp. 1-2 (2007).
Dorgan J, et al, "Polyactides: properties and prospects of an environmentally benign plastic from renewable resources", Macromol Symp, vol. 175, pp. 55-66 (2001).
Drumright R, et al, "Polyactic Acid Technology", Advanced Materials, vol. 12, Issue 23, pp. 1-6 (2000).

(Continued)

*Primary Examiner* — Robert S Jones
(74) *Attorney, Agent, or Firm* — Timothy H. Van Dyke; Beusse, Wolter, Sanks & Maire PLLC

(57) ABSTRACT

Various embodiments relate to biorenewable and water-degradable co-polymers and methods of producing co-polymers that include a plurality of first monomeric units and a plurality of second monomeric units joined by a plurality of hydrolytically-sensitive ester linkages. Each of the plurality of first monomeric units may be derived from a first monomer. The first monomer may be the product of a reaction between itaconic acid and a first amino acid. Each of the plurality of second monomeric units may be derived from a second monomer. The second monomer may be the product of a reaction between itaconic acid and a second amino acid. The co-polymers may be a product of the reaction of the first monomer and the second monomer in the presence of a diol. The co-polymers may have a glass transition temperature of about 50° C. or greater.

18 Claims, 9 Drawing Sheets

(56) References Cited

OTHER PUBLICATIONS

Ecotricity, "When will fossil fuels run out?", pp. 1-5, (2019).
Edlund U, et al, "Polyesters based on diacid monomers", Advanced Drug Delivery Reviews, vol. 55, pp. 589-609 (2003).
Farlow A, et al, "Reactions with aminobenzoic acids via diazonium salts open new routes to bio-derived aromatics", Int J Organic Chem, vol. 6, pp. 95-99 (2016).
Feldman S, et al, "Sickle Cell Anemia: reexamining the first 'molecular disease'", Bulletin of the History of Medicine, vol. 71, Issue 4, pp. 1-25 (1997).
Field JA, et al, "Biodegradability of chlorinated solvents and related chlorinated aliphatic compounds", Reviews in Enviorn Science & BioTechnol, vol. 3, pp. 185-254 (2004).
Frederiksen C, et al, "Light-induced quality changes in plain yoghurt packed in polylactate and polystyrene", Eur Food Res Technol, vol. 217, pp. 61-69 (2003).
Fukushima K, et al, "Review: Stereocomplexed polylactides (neo-PLA) as high-performance bio-based polymers: their formation, properties, and application", Polymer Int, vol. 55, pp. 626-642 (2006).
Garlotta D, et al, "A literature review of Poly(Lactic Acid)", J Polymers Environment, vol. 9, Issue 2, pp. 1-22 (2001).
Gopferich A, "Mechanisms of polymer degradation and erosion", Biomaterials, vol. 17, pp. 103-114 (1996).
Gotro J, "Polyethylene Furanoate (PEF): 100% biobased polymer to compete with PET?", Polymer Innovation Blog, pp. 1-12 (2013).
Haaf F, et al, "Polymers of N-Vinylpyrrolidone: synthesis characterization and uses", Polymer Journal, vol. 17, pp. 143-152 (1985).
Haugaard V, et al, "Quality changes in orange juice packed in materials based on polylactate", Eur Food Res Technol, vol. 214, pp. 423-428 (2002).
Hernandez N, et al, "The battle for the 'green' polymer. Different approaches for biopolymer synthesis: bioadvantaged vs. bioreplacement", Org Biomol Chem, vol. 12, pp. 1-16 (2014).
Hidalgo-Ruz V, et al, "Microplastics in the marine environment: a review of the methods used for identification and quantification", Environment Science Technology, vol. 46, pp. 3060-3075 (2012).
Horitsu H, et al, "Production of Itaconic Acid by aspergillus terreus immobilized in polyacrylamide gels", Eur J Appl Microbiol Biotechnol, vol. 18, pp. 358-360 (1983).
Hoskins J, et al, "Cyclic polyesters: synthetic approaches and potential applications", Polymer Chemistry, vol. 2, pp. 289-299 (2011).
Kakuta M, et al, "Stereoblock polylactides as high-performance bio-based polymers", J Macromol Science, vol. 49, pp. 107-140 (2009).
Koma D, et al, "Production of p-Aminobenzoic acid by metabolically engineered *Escherichia coli*", Bioscience Biotech Biochem, vol. 78, Issue 2, pp. 350-357 (2014).
Komula D, "Completing the Puzzle: 100% plant-derived PET", Bioplastics Magazine, vol. 6, pp. 1-4 (2011).
Kotek R, et al, "Novel Methods for obtaining high modulus aliphatic polyamide fibers", Journal of Macromol Science Part C: Polymer Reviews, vol. 45, Issue 3, pp. 201-230 (2005).
Kunioka M, et al, "Biodegradation of poly(lactic acid) powders proposed as the reference test materials for the international standard of biodegradation evaluation methods", Polymer Degradation and Stability, vol. 91, pp. 1919-1928 (2006).
Langer R, et al, "Designing Materials for biology and medicine", Nature, vol. 428, pp. 1-6 (2004).
Law KL, et al, "Plastic Accumulation in the north atlantic subtropical gyre", Science, vol. 329, pp. 1-5 (2010).
Lebreton LC, et al, "Numerical modelling of floating debris in the world's oceans", Marine pollution bulletin, vol. 64, pp. 653-661 (2012).
Leuchtenberger W, et al, "Biotechnological production of amino acids and derivatives: current status and prospects", Appl Microbiol Biotechnol, vol. 69, pp. 1-8 (2005).
Liu T, et al, "Synthesis of polymandelide: a degradable polylactide derivative with polystyrene-like properties", Macromolecules, vol. 40, pp. 6040-6047 (2007).
Login R, "Pyrrolidone-Based surfactants (a literature review)", JAOCS, vol. 72, Issue 7, pp. 1-13 (1995).
Luten J, et al, "Biodegradable polymers as non-viral carriers for plasmid DNA delivery", J Controlled Release, vol. 126, pp. 97-110 (2008).
Mathers R, "How well can renewable resources mimic commodity monomers and polymers?", Polymer Chemistry, vol. 50, pp. 1-15 (2012).
Matweb, "Tensile Property Testing of plastics", pp. 1-2, http://www.matweb.com/reference/tensilestrength.aspx (2016).
Maximenko N, et al, "Pathways of marine debris derived from trajectories of lagrangian drifters", Marine Pollution Bulletin, vol. 65, pp. 51-62 (2012).
Mialon L, et al, "Biorenewable polyethylene terephthalate mimics derived from lignin and acetic acid", Green Chemistry, vol. 12, pp. 1704-1706 (2010).
Mialon L, et al, "Polyalkylenehydroxybenzoates (PAHBs): Biorenewable aromatic/aliphatic polyesters from lignin", Macromol. Rapid. Commun., vol. 32, pp. 1386-1392 (2011).
Miller S, "Sustainable polymers: opportunities for the next decade", ACS Macro Letters, vol. 2, pp. 550-554 (2013).
Miller S, "Sustainable Polymers: opportunities for the next decade", ACS Macro Lett, vol. 2, pp. 550-554 (2013).
Miyata T, et al, "Crystallization behavior of poly(L-lactide)", Polymer, vol. 39, Issue 22, pp. 5515-5521 (1998).
Mueller RJ, "Biological degradation of synthetic polyesters-enzymes as potential catalysts for polyester recycling", Process biochemistry, vol. 41, pp. 2124-2128 (2006).
Mulhaupt R, "Green polymer chemistry and bio-based plastics: dreams and reality", Macromolecular chemistry and physics, vol. 214, pp. 159-174 (2013).
Mulhaupt R., "Hermann Staudinger and the origin of macromolecular chemistry", Agnew Chemistry Int. Ed., vol. 43, pp. 1054-1063 (2004).
Munoz-Guerra S, et al, "Renewable terephthalate polyesters from carbohydrate-based bicyclic monomers", Green Chem, vol. 16, pp. 1-24 (2014).
Nguyen H, et al, "Polyesters from Bio-aromatics", American Chemical Society, Chapter 24, pp. 1-9 (2015).
Nguyen H, et al, "Polyethylene ferulate (PEF) and congeners: polystyrene mimics derived from biorenewable aromatics", Green Chemistry, vol. 17, pp. 1-7 (2015).
Okabe M, et al, "Biotechnological production of itaconic acid and its biosynthesis in *Aspergillus terreus*", Appl Microbiol Biotechnol, vol. 84, pp. 597-606 (2009).
Papageorgiou G, et al, "Novel poly(propylene terephthalate-co-succinate) random copolymers: synthesis, solid structure, and enzymatic degradation study", Macromolecules, vol. 41, pp. 1675-1684 (2008).
Park C, & Kurian J, "DuPont sorona polymer a new bio-based material for the $21^{st}$ century", Du Pont, p. 1 (2010).
Qi P, et al, "Synthesis of biorenewable and water-degradable polylactam esters from itaconic acid", Green Chemistry, vol. 18, pp. 1-7 (2016).
Robert T, et al, "Itaconic acid—a versatile building block for renewable polyesters with enhanced functionality", Green Chemistry, vol. 18, pp. 1-13 (2016).
Satoh K, et al, "Precision synthesis of bio-based acrylic thermoplastic elastomer by RAFT polymerization of itaconic acid derivatives", Macromolecular Rapid Commun, vol. 35, pp. 161-167 (2014).
Scott E, et al, "Biomass in the manufacture of industrial products—the use of proteins and amino acids", Appl Microbiol Biotechnol, vol. 75, pp. 751-762 (2007).
Scott G, "Green Polymers", Polymer degradation and stability, vol. 68, pp. 1-7 (2000).
Shah A, et al, "Biological degradation of plastics: a comprehensive review", Biotechnology Advances, vol. 26, pp. 246-265 (2008).
Singh R, et al, "A general and efficient synthesis of 3,6-diazabicyclo[3.2.1]octanes", Tetrahedron, vol. 62, pp. 4011-4017 (2006).

(56) References Cited

OTHER PUBLICATIONS

Sonia G, et al, "Oxadiazolo pyrrolidine carboxamides as enoyl-ACP reductase inhibitors: design, synthesis and antitubercular activity screening", Med Chem Res, vol. 22, pp. 3428-3433 (2013).
Sousa A, et al, "Biobased polyesters and other polymers from 2,5-furandicarboxylic acid: a tribute to furan excellency", Polymer Chemistry, vol. 6, pp. 1-24 (2015).
Steiger M, et al, "Biochemistry of microbial itaconic acid production", Frontiers in Microbiology, vol. 4, Issue 23, pp. 1-5 (2013).
Sun H, et al, "Amino Acid containing degradable polymers as functional biomaterials: rational design, synthetic pathway and biomedical applications", Biomacromolecules, vol. 12, pp. 1937-1955 (2011).
Tsuji H, "Poly(lactide) stereocomplexes: formation, structure, properties, degradation, and applications", Macromol Biosci, vol. 5, pp. 569-597 (2005).
Tsuji H, et al, "Properties and morphologies of poly(L-lactide): 1. Annealing condition effects on properties and morphologies of poly(L-lactide)", Polymer, vol. 36, Issue 14, pp. 2709-2716 (1995).
Twibanire J, et al, "Polyester Dendrimers", Polymers, vol. 4, pp. 794-879 (2012).
Vilela C, et al, "The quest for sustainable polyesters—insights into the future", Polymer chemistry, vol. 5, pp. 1-23 (2014).
Wang S, et al, "Sodium titanium tris(glycolate) as a catalyst for the chemical recycling of poly(ethylene terephthalate) via glycolysis and repolycondensation", Polymer Degradation and Stability, vol. 114, pp. 105-114 (2015).
Wettstein S, et al, "RuSn bimetallic catalysts for selective hydrogenation of levulinic acid to y-valerolactone", Applied Catalysis B: Environmental, pp. 321-329 (2012).
World Economic Forum, "The new plastics economy rethinking the future of plastics", pp. 1-36 (2016).

\* cited by examiner

Table 2

| Entry | Polymers | Monomer ratio (diacid:diol) | Yield (%) | $M_n^b$ (Da) | $M_w^b$ (Da) | PDI$^b$ | $T_g^c$ (°C) | $T_{d0}^d$ (°C) |
|---|---|---|---|---|---|---|---|---|
| 1 | | | 84 | 20,800 | 44,700 | 2.1 | 60 | 387 |
| 2 | | 1.0 : 1.0 | 63 | 10,000 | 40,800 | 4.1 | 56 | 359 |
| 3 | | 1.0 : 1.2 | 88 | 23,200 | 52,500 | 2.3 | 62 | 373 |
| 4 | | 1.0 : 1.1 | 90 | 19,500 | 50,300 | 2.6 | 50 | 368 |
| 5 | | 1.0 : 1.1 | 88 | 24,900 | 59,800 | 2.4 | 39 | 373 |
| 6 | | 1.0 : 1.05 | 91 | 21,200 | 47,300 | 2.2 | 29 | 373 |
| 7 | | 1.0 : 1.05 | 86 | 23,400 | 79,200 | 3.3 | 24 | 376 |
| 8 | | Commercial sample$^e$ | | 91,200 | 201,800 | 2.2 | 53 | 343 |
| 9 | | Commercial sample$^f$ | | 34,100 | 75,500 | 2.2 | 83 | 414 |

FIG. 2

BIORENEWABLE, WATER-DEGRADABLE POLYMERS AND CO-POLYMERS

CROSS-REFERENCE TO RELATED APPLICATION

This application claims the benefit of U.S. Provisional Patent Application No. 62/524,227, filed Jun. 23, 2017, titled Biorenewable and Water-Degradable Polylactam Esters, which is incorporated by reference herein in its entirety.

STATEMENT REGARDING FEDERALLY SPONSORED RESEARCH OR DEVELOPMENT

This invention was made with government support under CHE1305794 and CHE1607263 awarded by the National Science Foundation. The government has certain rights in the invention.

BACKGROUND

As the commercial plastics industry was born and thrived in the last century, a great portion of finite resources was dedicated to polymer production. A handful of commercial polymers—poly(ethylene terephthalate) (PET), polyethylene (PE), polyvinylchloride (PVC), polypropylene (PP), polystyrene (PS), and polycarbonate (PC)—have dominated the plastics market for many decades because of their low cost and unique thermal and mechanical properties. However, the overutilization of these materials has revealed dire environmental issues. As a result, there is a need for new polymers to overcome the aforementioned deficiencies.

SUMMARY

Various embodiments relate to co-polymers and methods of producing co-polymers that include a plurality of first monomeric units and a plurality of second monomeric units joined by a plurality of hydrolytically-sensitive ester linkages. Each of the plurality of first monomeric units may be derived from a first monomer. The first monomer may be the product of a reaction between itaconic acid and a first amino acid. Each of the plurality of second monomeric units may be derived from a second monomer. The second monomer may be the product of a reaction between itaconic acid and a second amino acid. The co-polymers may be a product of the reaction of the first monomer and the second monomer in the presence of a diol. The co-polymers may have a glass transition temperature of about 50° C. or greater. 94% or more of the plurality of hydrolytically-sensitive ester linkages may become hydrolyzed after one year of exposure to water, making the co-polymers biorenewable and water-degradable.

According to various embodiments, the first amino acid may be substituted or unsubstituted para-aminobenzoic acid. The second amino acid may be a natural or non-natural substituted or unsubstituted aliphatic amino acid. The second amino acid may be glycine. The diol may be a 1,3-diol, a 1,4-diol, or a-1,5 diol. The diol may be 1,3-propanediol. The first monomeric unit and the second monomeric unit may be present in a 1:1 ratio. The first monomeric unit and the second monomeric unit may be present in a ratio that is not 1:1. The first amino acid may be para-aminobenzoic acid and the second amino acid may be glycine. The first amino acid may be para-aminobenzoic acid, the second amino acid may be glycine, and the diol may be 1,3-propanediol.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure, in which:

FIG. 2 shows a table illustrating molecular weight and thermal data according to various embodiments;

DETAILED DESCRIPTION

Figure 1:
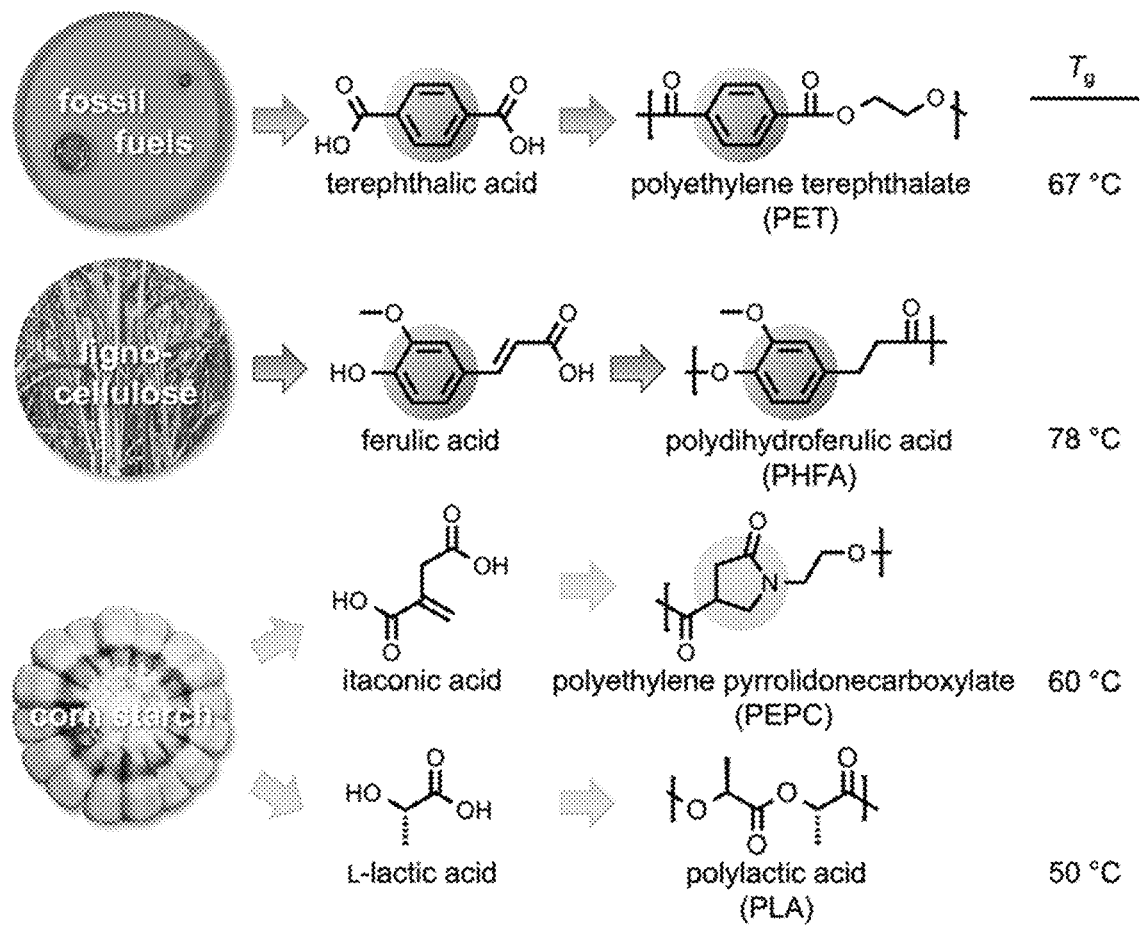
FIG. 1 is a schematic diagram illustrating an example in which the glass transition temperature (Tg) of polylactic acid (PLA) can be excelled by incorporating aromatic (PET), bioaromatic (PHFA), or bioheterocyclic (PEPC) motifs into the polyester main-chain.

It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of encapsulation, materials science, mechanical engineering, chemistry, food science, biotechnology, and the like. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are by weight, temperature is in ° C., and pressure is at or near atmospheric. Standard temperature and pressure are defined as 20 ° C. and 1 atmosphere.

Unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, "aliphatic" or "aliphatic group" refers to a saturated or unsaturated, linear or branched, cyclic (non-aromatic) or heterocyclic (non-aromatic), hydrocarbon or hydrocarbon group and encompasses alkyl, alkenyl, and alkynyl groups, and alkanes, alkene, and alkynes, for example.

As used herein, "alkane" refers to a saturated aliphatic hydrocarbon which can be straight or branched, having 1 to 40, 1 to 20, 1 to 10, or 1 to 5 carbon atoms, where the stated range of carbon atoms includes each intervening integer individually, as well as sub-ranges. Examples of alkane include, but are not limited to methane, ethane, propane, butane, pentane, and the like. Reference to "alkane" includes unsubstituted and substituted forms of the hydrocarbon.

As used herein, "alkyl" or "alkyl group" refers to a saturated aliphatic hydrocarbon radical which can be straight or branched, having 1 to 40, 1 to 20, 1 to 10, or 1 to 5 carbon atoms, where the stated range of carbon atoms includes each intervening integer individually, as well as sub-ranges. Examples of alkanes include, but are not limited to methyl, ethyl, n-propyl, i-propyl, n-butyl, s-butyl, t-butyl, n-pentyl, and s-pentyl. Reference to "alkyl" or "alkyl group" includes unsubstituted and substituted forms of the hydrocarbon group.

As used herein, "alkene" refers to an aliphatic hydrocarbon which can be straight or branched, containing at least one carbon-carbon double bond, having 2 to 40, 2 to 20, 2 to 10, or 2 to 5 carbon atoms, where the stated range of carbon atoms includes each intervening integer individually, as well as sub-ranges. Examples of alkene groups include, but are not limited to, ethene, propene, and the like. Reference to "alkene" includes unsubstituted and substituted forms of the hydrocarbon.

As used herein, "alkenyl" or "alkenyl group" refers to an aliphatic hydrocarbon radical which can be straight or branched, containing at least one carbon-carbon double bond, having 2 to 40, 2 to 20, 2 to 10, or 2 to 5 carbon atoms, where the stated range of carbon atoms includes each intervening integer individually, as well as sub-ranges. Examples of alkenyl groups include, but are not limited to, ethenyl, propenyl, n-butenyl, i-butenyl, 3-methylbut-2-enyl, n-pentenyl, heptenyl, octenyl, decenyl, and the like. Reference to "alkyl" or "alkyl group" includes unsubstituted and substituted forms of the hydrocarbon group.

As used herein, "alkyne" refers to straight or branched chain hydrocarbon groups having 2 to 40, 2 to 20, 2 to 10, or 2 to 5 carbon atoms and at least one triple carbon to carbon bond. Reference to "alkyne" includes unsubstituted and substituted forms of the hydrocarbon.

As used herein, "alkynyl" or "alkynyl group" refers to straight or branched chain hydrocarbon groups having 2 to 40, 2 to 20, 2 to 10, or 2 to 5 carbon atoms and at least one triple carbon to carbon bond, such as ethynyl. Reference to "alkynyl" or "alkynyl group" includes unsubstituted and substituted forms of the hydrocarbon group.

As used herein, "aromatic" refers to a monocyclic or multicyclic ring system of 6 to 20 or 6 to 10 carbon atoms having alternating double and single bonds between carbon atoms. Exemplary aromatic groups include benzene, naphthalene, and the like. Reference to "aromatic" includes unsubstituted and substituted forms of the hydrocarbon.

As used herein the term "aryl" refers to an optionally substituted mono- or bicyclic carbocyclic ring system having one or two aromatic rings including, but not limited to, phenyl, benzyl, naphthyl, tetrahydronaphthyl, indanyl, indenyl, and the like. AOptionally substituted aryl@ includes aryl compounds having from zero to four substituents, and Asubstituted aryl@ includes aryl compounds having one or more substituents. The term ($C_5$-$C_8$ alkyl)aryl refers to any aryl group which is attached to the parent moiety via the alkyl group.

The term "bicyclic" represents either an unsaturated or saturated stable 7- to 12-membered bridged or fused bicyclic carbon ring. The bicyclic ring may be attached at any carbon atom which affords a stable structure. The term includes, but is not limited to, naphthyl, dicyclohexyl, dicyclohexenyl, and the like.

By "chemically feasible" is meant a bonding arrangement or a compound where the generally understood rules of organic structure are not violated. The structures disclosed herein, in all of their embodiments are intended to include only "chemically feasible" structures, and any recited structures that are not chemically feasible, for example in a structure shown with variable atoms or groups, are not intended to be disclosed or claimed herein.

As used herein "linked" and/or "joined" can refer to the transient or stable chemical bonding of two or more compounds by a chemical reaction. The chemical reaction can be esterification.

As used herein, "cyclic" hydrocarbon refers to any stable 4, 5, 6, 7, 8, 9, 10, 11, or 12 membered, (unless the number of members is otherwise recited), monocyclic, bicyclic, or tricyclic cyclic ring.

As used herein, a "derivative" of a compound refers to a chemical compound that may be produced from another compound of similar structure in one or more steps, as in replacement of H by an alkyl, acyl, or amino group.

As used herein, "halo", "halogen", "halide", or "halogen radical" refers to a fluorine, chlorine, bromine, iodine, and astatine, and radicals thereof. Further, when used in compound words, such as "haloalkyl" or "haloalkenyl", "halo" refers to an alkyl or alkenyl radical in which one or more hydrogens are substituted by halogen radicals. Examples of haloalkyl include, but are not limited to, trifluoromethyl, trichloromethyl, pentafluoroethyl, and pentachloroethyl.

The term "haloalkyl" as used herein refers to an alkyl radical bearing at least one halogen substituent, for example, chloromethyl, fluoroethyl or trifluoromethyl and the like.

"Heteroaryl" refers to any stable 5, 6, 7, 8, 9, 10, 11, or 12 membered, (unless the number of members is otherwise recited), monocyclic, bicyclic, or tricyclic heterocyclic ring that is aromatic, and which consists of carbon atoms and 1, 2, 3, or 4 heteroatoms independently selected from the group consisting of N, O, and S. If the heteroaryl is defined by the number of carbons atoms, then 1, 2, 3, or 4 of the listed carbon atoms are replaced by a heteroatom. If the heteroaryl group is bicyclic or tricyclic, then at least one of the two or three rings must contain a heteroatom, though both or all three may each contain one or more heteroatoms. If the heteroaryl group is bicyclic or tricyclic, then only one of the rings must be aromatic. The N group may be N, NH, or N-substituent, depending on the chosen ring and if substituents are recited. The nitrogen and sulfur heteroatoms may optionally be oxidized (e.g., S, S(O), S(O)$_2$, and N—O). The heteroaryl ring may be attached to its pendant group at any heteroatom or carbon atom that results in a stable structure. The heteroaryl rings described herein may be substituted on carbon or on a nitrogen atom if the resulting compound is stable."

The term "heteroatom" means for example oxygen, sulfur, nitrogen, phosphorus, or silicon (including, any oxidized form of nitrogen, sulfur, phosphorus, or silicon; the quaternized form of any basic nitrogen or; a substitutable nitrogen of a heterocyclic ring.

"Heterocycle" refers to any stable 4, 5, 6, 7, 8, 9, 10, 11, or 12 membered, (unless the number of members is otherwise recited), monocyclic, bicyclic, or tricyclic heterocyclic ring that is saturated or partially unsaturated, and which consists of carbon atoms and 1, 2, 3, or 4 heteroatoms independently selected from the group consisting of N, O, and S. If the heterocycle is defined by the number of carbons atoms, then from 1, 2, 3, or 4 of the listed carbon atoms are replaced by a heteroatom. If the heterocycle is bicyclic or tricyclic, then at least one of the two or three rings must contain a heteroatom, though both or all three may each contain one or more heteroatoms. The N group may be N, NH, or N-substituent, depending on the chosen ring and if substituents are recited. The nitrogen and sulfur heteroatoms optionally may be oxidized (e.g., S, S(O), S(O)$_2$, and N—O). The heterocycle may be attached to its pendant group at any heteroatom or carbon atom that results in a stable structure. The heterocycles described herein may be substituted on carbon or on a nitrogen atom if the resulting compound is stable.

The term "$C_1$-$C_n$ alkyl" wherein n is an integer, as used herein, represents a branched or linear alkyl group having from one to the specified number of carbon atoms. Typically, $C_1$-$C_6$ alkyl groups include, but are not limited to, methyl, ethyl, n-propyl, iso-propyl, butyl, iso-butyl, sec-butyl, tert-butyl, pentyl, hexyl, and the like.

The term "$C_2$-$C_n$ alkenyl" wherein n is an integer, as used herein, represents an olefinically unsaturated branched or linear group having from 2 to the specified number of carbon atoms and at least one double bond. Examples of such groups include, but are not limited to, 1-propenyl, 2-propenyl, 1,3-butadienyl, 1-butenyl, hexenyl, pentenyl, and the like.

The term "$C_2$-$C_n$ alkynyl" wherein n is an integer refers to an unsaturated branched or linear group having from 2 to the specified number of carbon atoms and at least one triple bond. Examples of such groups include, but are not limited to, 1-propynyl, 2-propynyl, 1-butynyl, 2-butynyl, 1-pentynyl, and the like.

The term "$C_3$-$C_n$ cycloalkyl" wherein n=8, represents cyclopropyl, cyclobutyl, cyclopentyl, cyclohexyl, cycloheptyl, and cyclooctyl.

As used herein, the term "optionally substituted" typically refers to from zero to four substituents, wherein the substituents are each independently selected. Each of the independently selected substituents may be the same or different than other substituents. For example, the substituents of an R group of a formula may be optionally substituted (e.g., from 1 to 4 times) with independently selected H, halogen, hydroxy, acyl, alkyl, alkenyl, alkynyl, cycloalkyl, heterocyclo, aryl, heteroaryl, alkoxy, amino, amide, thiol, sulfone, sulfoxide, oxo, oxy, nitro, carbonyl, carboxy, amino acid sidechain and amino acid.

The term "substituted" refers to any one or more hydrogen atoms on the designated atom (e.g., a carbon atom) that can be replaced with a selection from the indicated group (e.g., halide, hydroxyl, alkyl, and the like), provided that the designated atom's normal valence is not exceeded.

The term "homopolymer" is intended to denote a polymer comprised of repeating identical units or monomers. Co-polymer is used herein to denote polymers of two or more different monomers. Co-polymers may be combinations of monomers comprising 2-pyrrolidone formed from itaconic acid or derivatives thereof.

As used herein, itaconic acid can refer to itaconic acid or a substituted or unsubstituted derivative thereof.

The term "hydrolytically-sensitive ester linkage" is an ester linkage formed by the reaction of an alcohol and a carboxylic acid that can be broken or degraded by exposure to water, reverting the copolymer back to its respective alcohol and diacid starting materials.

Copolymers as described herein can be formed by reaction of any combination of first monomers, second monomers, and diols as described herein.

As used herein, a hydrolytically sensitive ester linkage can be an ester linkage formed between a diol and a first monomer. A hydrolytically sensitive ester linkage can also be an ester linkage formed between a diol and a second monomer. A hydrolytically sensitive ester linkage can be both an ester linkage formed between a diol and a first monomer and an ester linkage formed between a diol and a second monomer. The first monomer can a diacid being formed by the reaction of itaconic acid with a first amino acid, the first amino acid comprising a substituted or unsubstituted aromatic moiety. The second monomer can be a diacid formed by the reaction with itaconic acid and a second amino acid, the second amino acid being substituted or unsubstituted aliphatic amino acid.

Embodiments of the present disclosure provide for novel polymers. Polymers as described herein may be homopolymers or copolymers which maintain desirable properties such as a high glass transition temperature and retain other desirable properties, such as high biodegradability (especially in water).

Itaconic acid, a naturally occurring compound mass-produced via fermentation of glucose, can be reacted with aminoalcohols or diamines to afford hydroxyacids or diacid monomers containing the 2-pyrrolidone lactam. One hydroxyacid can be polymerized, or a combination of hydroxyacids can be copolymerized to yield polylactam esters. Or a diacid monomer or combination of diacid monomers can be copolymerized with diols to yield polylactam esters. The polymeric structure can be controlled to afford polymers with glass transition temperatures higher than that of the commercial polyester polylactic acid (PLA). These polymers exhibited long term stability in humid air, but in bulk water, the hydrophilic pyrrolidone ring facilitates water absorption, which leads to main-chain ester hydrolysis over the course of one year. According to various embodiments, the incorporated pyrrolidone ring may function as a trigger to effect degradation back to the monomer in the natural environment.

Homopolymerization of the hydroxy-acids or copolymerization of the diacids with diols, respecively, can yield polylactam esters with higher glass transition temperatures and faster hydrolytic degradation compared to the commercial polyester polylactic acid (PLA). These polymers exhibited long term stability in humid air, but hydrolytic degradation back to monomer in neutral water over the course of one year.

One competitive advantage is the low price of the starting materials, itaconic acid, which costs less than $1.50 per kilogram. Thus, it can compete with PET (polyethylene terephthalate) or PS (polystyrene) or PLA (polylactic acid) on a cost basis. However, it is the only one of these that can degrade, completely, under hydrolytic or composting conditions. The glass transition temperatures, with the current polymers, is about 62 degrees C., besting PLA, but not PET or PS. However, other formulations will likely allow for higher glass transition temperatures, likely above 100 degrees C. in order to excel PET and PS.

A commercial application target is use of materials as described herein for dry packaging applications. For example, as a replacement for PET (polyethylene terephthalate) blister packaging. It could also be used for short-term contact with water or food, as a replacement for PS (polystyrene) or PLA (polylactic acid).

Described herein are polymers comprising 2-pyrrolidone lactams derived from itaconic acid precursors. Polymers as described herein can be co-polymers exhibiting the traits of high degradability in a medium such as air or water and high glass temperature. Polymers as described herein can be co-polymers comprising two monomers, wherein one monomer (the first monomer) imparts a high glass transition temperature to the co-polymer and the second monomer aids in imparting hydrophilicity and/or degradability in water. Copolymers as described herein can comprise one or more polymer units, wherein a polymer unit is the first and second monomers as described herein joined by an ester linkage, and individual monomers of a monomer unit can be joined by ester linkages.

Copolymers as described herein can comprise from about 1 to about 10,000 polymer units wherein the first and second monomers are present in equal amounts or ratios. Copolymers as described herein can comprise from about 1 to about 10,000 polymer units wherein the first and second monomers are present in unequal amounts or ratios.

For a co-polymer comprising two monomers, the first of the two monomers (the first monomer) can help impart a high glass transition temperature to the co-polymers. Monomers which help impart hydrophilicity and water degradability can be formed by the reaction of itaconic acid with a carboxylic acid, creating a diacid comprising a 2-pyrrolidone ring. The carboxylic acid can be para-aminobenzoic acid (or a substituted or unsubstituted derivative thereof). Reaction of this monomer with a second monomer, as described below, can create a co-polymer joined by an ester linkage with a high glass transition temperature.

For a co-polymer comprising two monomers, the second of the two monomers can help impart hydrophilicity and water degradability to the co-polymers. Monomers which help impart hydrophilicity and water degradability can be formed by the reaction of itaconic acid with an amino acid, creating a diacid comprising a 2-pyrrolidone ring. The amino can be glycine (or a substituted or unsubstituted derivative thereof) or another aliphatic amino acid, natural or non-natural (ie synthetic). Reaction of this monomer with a second monomer, as described below, can create an ester linkage which is sensitive to water and can hydrolyze in the presence thereof.

For a co-polymer comprising two monomers, the two monomers can be reacted in the presence of a diol to form a co-polymer comprising a first and second monomer joined by an ester linkage. This linkage can be a water sensitive ester linkage. The diol can be a 1,3-diol, a 1,4-diol, a 1,5-diol or others. The diol can be 1,3-propanediol.

Copolymers as described herein can comprise one or more polymer units having the formula $[(A)_x(B)_y]_m$ wherein A is a first monomer, B is a second monomer, monomers A and B are joined by a hydrolytically sensitive ester linkage as the result of reaction with one or more diols to form the copolymer, and m can be 1 to about 10000. A and B can be in ratios of about 1:9 to about 9:1 or, in an embodiment about 1:1. Copolymers can comprise more than polymer units and polymer units of a copolymer can be joined by hydrolytically sensitive ester linkage.

In certain embodiments, copolymers as describe herein can comprise polymer units having the formula $[(A)_{x1}(B)_{y1}]_m[(A)_{x2}(B)_{y2}]_n$, M and N can independently be 1 to about 10000. X1 and Y1 can be in ratios of about 1:9 to about 9:1. X2 to Y2 can be in ratios of 1:9 to about 9:1. The ratios of X1 and Y1 and X2 and Y2 can be selected independent of each other. $(A)_{x1}$ and $(A)_{x2}$ can be different monomers or the same. $(B)_{x1}$ and $(B)_{x2}$ can be different monomers or the same, and monomers of genus A are linked to monomers of genus B by a hydrolytically sensitive ester linkage as the result of reaction of the monomers with one or more diols. A(x1), A(x2), B(x1), and B(x2) can be selected independently of each other. The diol[s] which are used in the reaction to form $[(A)_{x1}(B)_{y1}]_m$ can be the same or different that those used in the reaction to form $[(A)_{x2}(B)_{y2}]_n$.

In certain aspects the glass transition temperature of co-polymers as described herein (Tg) can be about 50° C. or greater. In certain aspects the glass transition temperature (Tg) can be about 60° C. or greater. In certain aspects the glass transition temperature (Tg) can be about 70° C. or greater. In certain aspects the glass transition temperature (Tg) can be about 70° C. or greater.

In certain aspects, about 94% of ester linkages of co-polymers described herein can be hydrolyzed after a year of exposure to water. In some aspects, co-polymers as described herein are completely dissolved after exposure to water after 30 days of exposure. In some aspects, co-polymers as described herein are completely dissolved after exposure to water after one year of exposure.

Among a wide variety of linear polymers, polyesters have great potential because (1) structural diversity allows tailoring of their properties, (2) the main-chain ester functionality is an obvious point of water-degradation or bio-degradation, and (3) many are accessible from natural building blocks. Considerable research has focused on partially or completely biobased polyesters. The fastest growing, partially biorenewable polyester is 30% biobased PET (Plant-Bottle®), which is derived from bio-ethylene glycol and petrochemical terephthalic acid. Perhaps the most successful, fully biorenewable polyester is polylactic acid (PLA), made from corn starch or other carbohydrates. While PLA is 100% biobased, its useful temperature range is limited by its low glass transition temperature (Tg) of 50° C. and it composts very poorly in the environment, thus requiring industrial composting conditions. PET exhibits a notably higher Tg of 67° C., making it suitable for a wider range of applications. FIG. 1 is a schematic diagram illustrating an example in which the glass transition temperature (Tg) of polylactic acid (PLA) can be excelled by incorporating aromatic (PET), bioaromatic (PHFA), or bioheterocyclic (PEPC) motifs into the polyester main-chain. The superior thermal properties seem to originate with the aromatic/aliphatic motif present in the polymer backbone (FIG. 1). Recreating this hard/soft motif with bioaromatics from lignin (vanillin) or lignocellulose (ferulic acid, coumaric acid), several new biogenic polyesters and copolyesters with Tg values ranging from 78° C. to 153° C., surpassing the important benchmark of 100° C. for polystyrene (PS) may be produced.

Various embodiments provide high Tg thermoplastics. According to certain embodiments, biobased heterocycles may replace bioaromatics and confer the polymer chain rigidity and/or chain-chain interactions that are essential for high glass transition temperature materials. For example, according to various embodiments, a 2-pyrrolidone ring system may function as the hard component of a repeating hard/soft motif. This lactam was selected for several reasons. It can be prepared by reaction of a primary amine with the inexpensive and naturally-occurring molecule, itaconic acid (IA). The α,β-unsaturated carbonyl functional group of IA reacts efficiently with a variety of primary amine nucleophiles in environmentally acceptable solvents with simple workup procedures. The five-carbon diacid IA has been promulgated as one of the top twelve renewable chemicals available from biomass by the U.S. Department of Energy National Renewable Energy Laboratory because of its scalability, sustainability, and nontoxicity. It is presently mass-produced by glucose fermentation with Aspergillus terreus. This biosynthetic method yields 40 to 80 million kg per year with a cost near $1.5 USD per kg. Previous polymerization research with IA has generally followed two approaches: polycondensation of itaconic acid with diols to yield polyesters; and radical homopolymerization or copolymerization of dialkyl itaconate with other unsaturated monomers to prepare acrylic polymers. While polyamides from itaconic acid containing the pyrrolidone ring system have been reported, it appears that polyesters containing this lactam are novel. It was predicted that such polylactam esters might be more degradable than the reported polylactam amides because of the greater hydrolytic sensitivity of esters versus amides, generally.

Polyethylene 2-pyrrolidone-4-carboxylate (PEPC, FIG. 1) was selected as an exemplary paradigm polylactam ester because of its structural similarity to PET and polydihydroferulic acid (PHFA). For these three polymers, each repeat unit contains a rigid ring, two main-chain sp3 hybridized carbons, and ester connectivity (FIG. 1). Reaction scheme 1, below, describes the aza-Michael addition of ethanolamine to itaconic acid (IA), affording an intermediate amino diacid. Intramolecular cyclization generates water and the γ-lactam ring, which is part of the targeted monomer N-(2-hydroxyethyl)-2-pyrrolidone-4-carboxylic acid (HEPC), formed as the racemate. Several polar solvents were explored for this reaction, but water proved to give the highest yield (71% after recrystallization). No catalyst was necessary since ethanolamine was suitably active. Note that ethanolamine can be made in three steps from bioethanol or biosynthetically from serine.

The HEPC monomer was subjected to a solvent-free, two-stage meltpolymerization protocol with a variety of catalysts. A pre-polymerization stage under nitrogen at 180° C. commenced oligomerization and thus minimized loss of monomer to evaporation during the second stage, which ramped to 240° C. with dynamic vacuum. Removal of the water byproduct ensured the condensation polyesterification reaction (FIG. 1).

Reaction Scheme 1 illustrates an exemplary mechanism of monomer and polymer synthesis, according to various embodiments.

Reaction Scheme 1

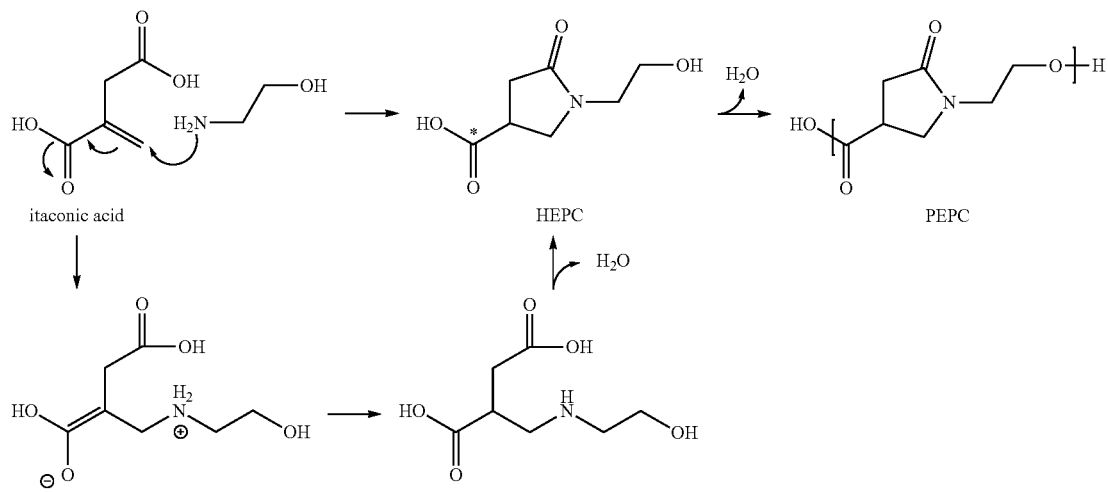

Table 1 shows the polymerization results from a survey of eight different catalysts, including Bronsted acids (Entries 1-3), Bronsted bases (Entries 4-5), and Lewis acids (Entries 6-11). Considering the polymer yield and molecular weight achieved with 1.0 mol % catalyst loading, the Bronsted bases excelled the Bronsted acids. But, the overall winner was Lewis acid Sb2O3 (Entry 8) with 78% yield, Mn=15 100, and PDI=2.7. The optimal loading of this catalyst was 2.0 mol %, which gave 84% yield, Mn=20 800, and PDI=2.1 (Entry 9). Other reaction conditions were varied, but did not improve the polymerization results. For example, a longer or hotter prepolymerization stage did not increase molecular weights. And higher ultimate polymerization temperatures (>240° C.) generally resulted in lower molecular weights and broader PDI values, possibly a consequence of decomposition.

TABLE 1

Conditions for polymerizing HEPC to PEPC (see Scheme 1)[a]

| Entry | Catalyst | Catalyst (mol %) | Yield[b] (%) | $M_n$[b] (g mol$^{-1}$) | PDI[b] |
|---|---|---|---|---|---|
| 1 | p-TSA | 1.0 | 56 | 9800 | 3.2 |
| 2 | Amberlyst ®[c] | 1.0 | 42 | 7200 | 2.9 |
| 3 | H$_2$SO$_4$ | 1.0 | 24 | 5600 | 6.4 |
| 4 | K$_2$CO$_3$ | 1.0 | 63 | 11 400 | 3.7 |
| 5 | Na$_2$HPO$_4$ | 1.0 | 80 | 13 800 | 2.7 |
| 6 | MgO | 1.0 | 60 | 10 200 | 3.4 |
| 7 | Sn(Oct)$_2$ | 1.0 | 81 | 5200 | 2.6 |
| 8 | Sb$_2$O$_3$ | 1.0 | 78 | 15 100 | 2.7 |

TABLE 1-continued

Conditions for polymerizing HEPC to PEPC (see Scheme 1)[a]

| Entry | Catalyst | Catalyst (mol %) | Yield[b] (%) | $M_n$[b] (g mol$^{-1}$) | PDI[b] |
|---|---|---|---|---|---|
| 9 | Sb$_2$O$_3$ | 2.0 | 84 | 20 800 | 2.1 |
| 10 | Sb$_2$O$_3$ | 4.0 | 73 | 18 200 | 2.3 |
| 11 | Sb$_2$O$_3$ | 0.5 | 67 | 6000 | 2.9 |

Table 1 shows exemplary conditions for polymerizaing HEPC to PEPC according to various embodiments. In Table 1, the notation (a) indicates 180° C. under nitrogen for 4 hours, followed by a temperature ramp over 8 hours to 240° C. with dynamic vacuum. In Table 1, the notation (b) indicates gas permeation chromatography (GPC) in hexafluoroisopropanol (HFIP) at 40° C. vs. polymethyl methacrylate standards. In Table 1, the notation (c) indicates AMBERLYST® 15 hydrogen form (dry). AMBERLYST® is a registered trademark of The Dow Chemical Company or an affiliated company of Dow. AMBERLYST® is a macro reticular polystyrene-based ion exchange resin with strongly acidic sulfonic group. It serves as an excellent source of strong acid. It can also be used several times. AMBERLYST® 15 is a heat sensitive macro-porous sulfonic ion exchange acid resin which could be used as a catalyst.

Reaction Scheme 2 is an example according to various embodiments showing synthesis of polyalkylene ethylene bis(pyrrolidone carboxylate) (PAEBPC) polymers with n from 2 to 6.

Reaction Scheme 2

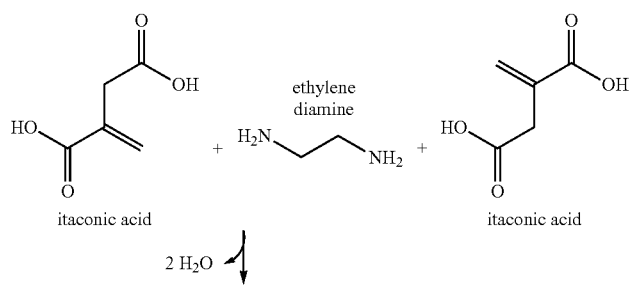

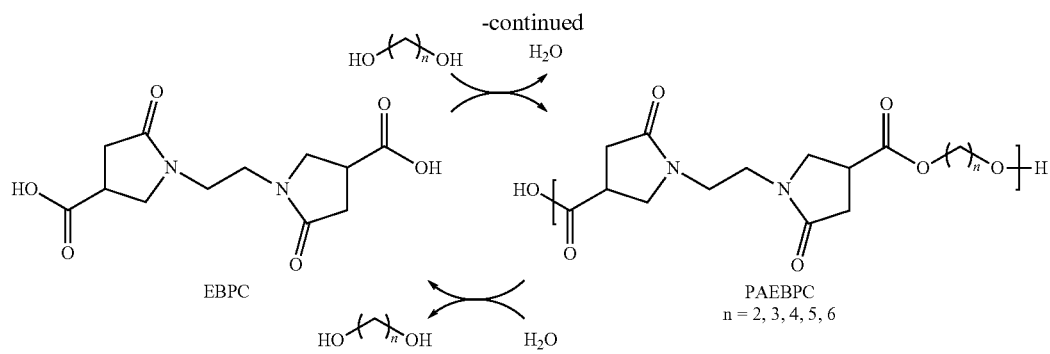

Reaction Scheme 2 illustrates another strategy for synthesizing polylactam esters. In this case, two equivalents of itaconic acid (IA) are reacted with ethylene diamine in water to afford a monomer bearing two lactam rings, ethylene bis(pyrrolidone carboxylic acid) (EBPC, 78% yield). This diacid monomer was copolymerized with several a,w-alkanediols, $HO(CH_2)nOH$, where n=2, 3, 4, 5, or 6 to give a homologous series of polyalkylene ethylene bis(pyrrolidone carboxylate) (PAEBPC) polymers. FIG. 2, Table 2 summarizes the polymerization results and compares the formed polymers as a function of the number of methylene spacers, n, present in the diol. These polymerizations employed the optimized conditions of Table 1: no solvent and 2.0 mol % $Sb_2O_3$ catalyst with a temperature ramp from 180 to 240° C.

FIG. 2, Table 2, Entry 2 shows the result when the diacid:diol ratio is 1.0:1.0. In this case, the yield (63%) and molecular weight (Mn=10 000) are relatively low, and the PDI is somewhat broad (PDI=4.1). Entry 3 shows that these numbers can be improved (yield=88%; Mn=23 200; PDI=2.3) when a slight excess of diol is employed. Quite plausibly, the diacid:diol ratio of 1.0:1.2 ensures the incorporation of ethylene glycol into the initially formed oligomers, avoiding sub-stoichiometric diol during the vacuum stage, which would lead to low molecular weight polymer. With the capability of Sb2O3 to catalyze both direct esterification and transesterification, any excess, volatile diol can be removed during the vacuum stage of the polymerization. The excess diol strategy also worked for the longer diols (n=3-6) of FIG. 2, Table 2, Entries 4-7, affording yields from 86 to 91% and good Mn values from 19 500 to 24 900.

FIG. 2 shows a table illustrating molecular weight and thermal data according to various embodiments, specifically molecular weight and thermal data for PEPC (Entry 1). (PAEBPC polymers made from diols of varying length (Entries 2-7), and commercial samples of PLA (entry 8) and PET (Entry 9). In FIG. 2, Table 2, (a) indicates with 2.0 mol % $Sb_2O_3$, 180° C. under nitrogen for 4 hours, followed by a temperature ramp over 8 hours to 240° C. with dynamic vacuum. In FIG. 2, Table 2, (b) indicates GPC in hexafluoroisopropanol (HFIP) at 40° C. vs. polymethyl methacrylate standards. In FIG. 2, Table 2, (c) indicates determined by Differential Scanning calorimetry (DSC). In FIG. 2, Table 2, (d) indicates Thermogravimetric analysis (TGA) temperature at which 50% mass loss was observed under nitrogen. In FIG. 2, Table 2, (e) indicates INGEO® polylactide (PLA) cup sample from NatureWorks, LLC. In FIG. 2, Table 2, (f) indicates bottle grade polyethylene terephthalate (PET) copolymer from TRADER JOE'S® Natural Mountain Spring Water.

FIG. 2, Table 2 summarizes the polylactam ester thermal properties, as measured by differential scanning calorimetry (DSC) and thermogravimetric analysis (TGA). The highest glass transition temperatures (Tg) of the series belong to PEPC (Entry 1, 60° C.) and the PAEBPC from ethylene glycol (Entry 3, n=2, 62° C.). Note that the lower molecular weight of Entry 2 negatively impacts its Tg value compared to the same polymer of entry 3 (56 vs. 62° C.). For the series of PAEBPC polymers with n=2 to 6, it is evident that lactam ring dilution by increasing alkylene connector length proportionally decreases the glass transition temperature. The Tg ranged from 62° C. (n=2) to 24° C. (n=6); so each additional methylene group dropped the Tg by about 10° C. According to DSC, these polymers are not crystalline; no melting temperatures are observed. This is somewhat expected since the polymers are likely atactic with insufficient long-range conformational order. Because lactam ring formation is stereorandom, the HEPC monomer is obtained as the racemate (R/S) and the EBPC monomer is obtained as a nearly equal ratio of diastereomers (55:45). Finally, FIG. 2, Table 2 shows the T50 values for these polylactam esters, the temperature at which 50% mass loss occurs according to thermogravimetric analysis (TGA) under nitrogen. The T50 decomposition temperatures (359-387° C.) excel that of commercial PLA (343° C., Entry 8) and approach that of commercial PET (414° C., Entry 9).

Since all polyesters potentially undergo hydrolysis, a preliminary degradation study was conducted under environmentally relevant conditions of (1) air or (2) neutral water. Six different polylactam esters (FIG. 2, Table 2, Entries 1 and 3-7) were molded into approximately 5 mm flattened pellets. These were simply exposed to air, or agitated continuously in deionized water with an orbital shaker. Interestingly, all polymers in water began to dissolve and their dissolution was complete after 30 days. After one year, the polymers exposed only to air exhibited just a slight decrease in molecular weight (10% or less) according to Gel Permeation Chromatography (GPC), whereas the polymers submerged in water were completely hydrolyzed to monomer (Mn ~500 Da).

Figure 3:
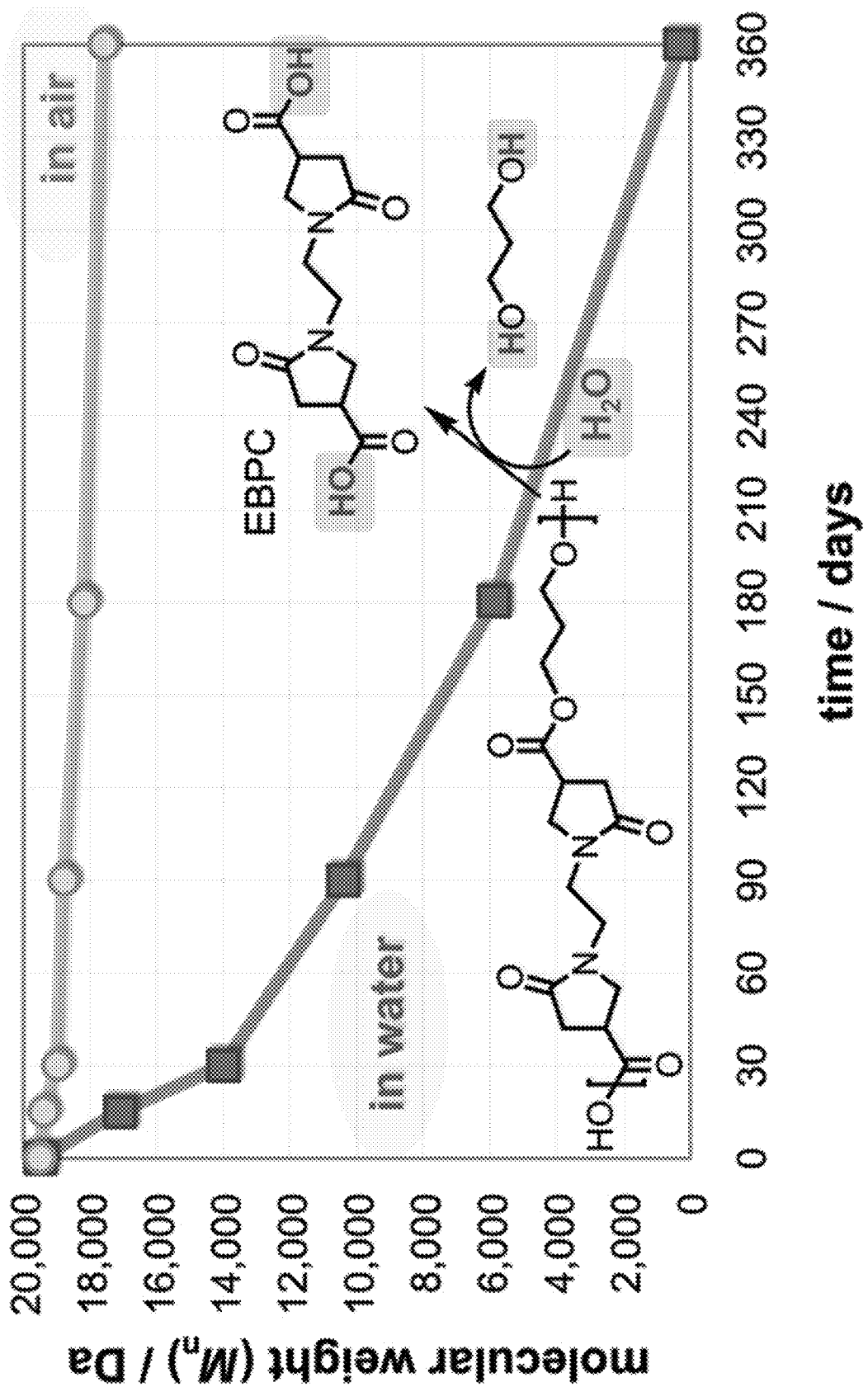
FIG. 3 is an annotated chart illustrating an example degradation study of polypropylene/[ethylene bis(pyrrolidone carboxylate)] in neutral water and in air for one year, according to various embodiments.

FIG. 3 shows the time-dependent molecular weight analysis for the polylactam ester of FIG. 2, Table 2, entry 4 (from $HOCH_2CH_2CH_2OH$) over 360 days. Exposed only to air, the polymer Mn decreased 10% from 19 500 to 17 600 during this time, but for the submerged sample, the polymer Mn decreased steadily and completely from 19 500 to 570 (below the detection limit for polymer with this instrument). Most likely, the polymer dissolution enhanced the hydrolysis kinetics. The facile dissolution of these polymers can be appreciated because of the hydrophilicity of structurally-related lactams and polylactams: N-methylpyrrolidone (NMP), which is miscible with water; and polyvinyl pyrrolidone (PVP), which is soluble in water. In contrast, the water-insolubility of PLA renders it much slower to hydrolyze, despite its similar sterics (alpha substitution) near the ester functional group.

FIG. 3 is an annotated chart illustrating an example degradation study of polypropylene/[ethylene bis(pyrrolidone carboxylate)] in neutral water and in air for one year, according to various embodiments.

Furthermore, 1H NMR analysis of the immersed polymers after one year shows regeneration of the corresponding diol and the EBPC di-carboxylic acid monomer. FIG. 3 shows the 1H NMR spectra for the polyethylene [ethylene bis(pyrrolidone carboxylate)] polymer (PEEBPC, FIG. 2, Table 2, Entry 3), the degradation products after one year of agitation in water, and authentic EBPC monomer. By integration, about 94% of the ester functional groups have hydrolyzed to afford ethylene glycol. The matching of the degradation spectrum to that of the original EBPC monomer confirms that hydrolysis has occurred at the ester group, but not at the amide functional group—leaving the lactam ring intact.

Figure 4:
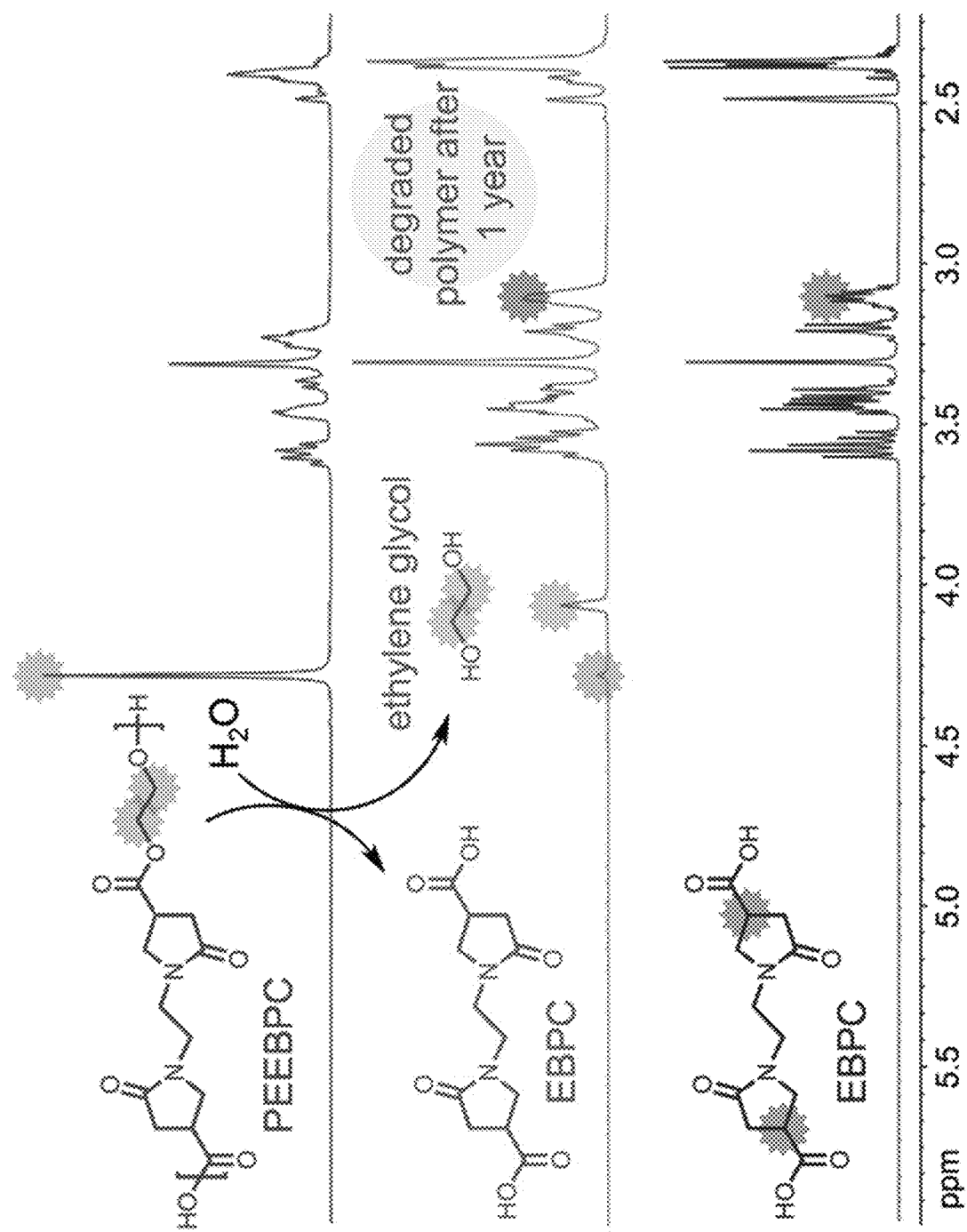
FIG. 4 is an example of an 1 H NMR spectra of polymer polyethylene [ethylene bis(pyrrolidone carboxylate)] polymer (PEEBPC) (top), its degraded product in water after one year (middle), and monomer EBPC (bottom), according to various embodiments.

FIG. 4 is an example of an 1H NMR spectra of polymer PEEBPC (top), its degraded product in water after one year (middle), and monomer EBPC (bottom), according to various embodiments.

This degradation pathway is also confirmed by MALDI-TOF and ESI-TOF analysis, which clearly shows PEPC (FIG. 2, Table 2, Entry 1) yielding the monomer HEPC (173 Da)+sodium (23 Da)=196 Da and higher oligomers with repeat units of 155 Da, upon acid-catalyzed hydrolysis (see the ESIt). Similarly, PPEBPC (FIG. 2, Table 2, entry 4) yields its monomer PEBPC (342 Da)+sodium (23 Da)=365 Da and higher oligomers with repeat units of 324 Da. According to various embodiments, therefore, the mainchain ester group may be the key feature that allows for polymer degradation. Compare this hydrolysis behavior to that of polylactam amides, which resemble PEPC (Reaction Scheme 1) except they are constructed with alkylene diamines and thus bear no ester functionality. In this case, strongly alkaline solutions (pH>10), one year's time in soil, or UVirradiation (250-450 nm) in water effected pyrrolidone ring opening (hydrolysis) and polymer solubilization, but not chain scission. Apparently the remaining amide mainchain functionality is robust and survives these various conditions.

Reaction scheme 3 illustrates an example of a copolymer synthesis according to various embodiments.

Reaction Scheme 3

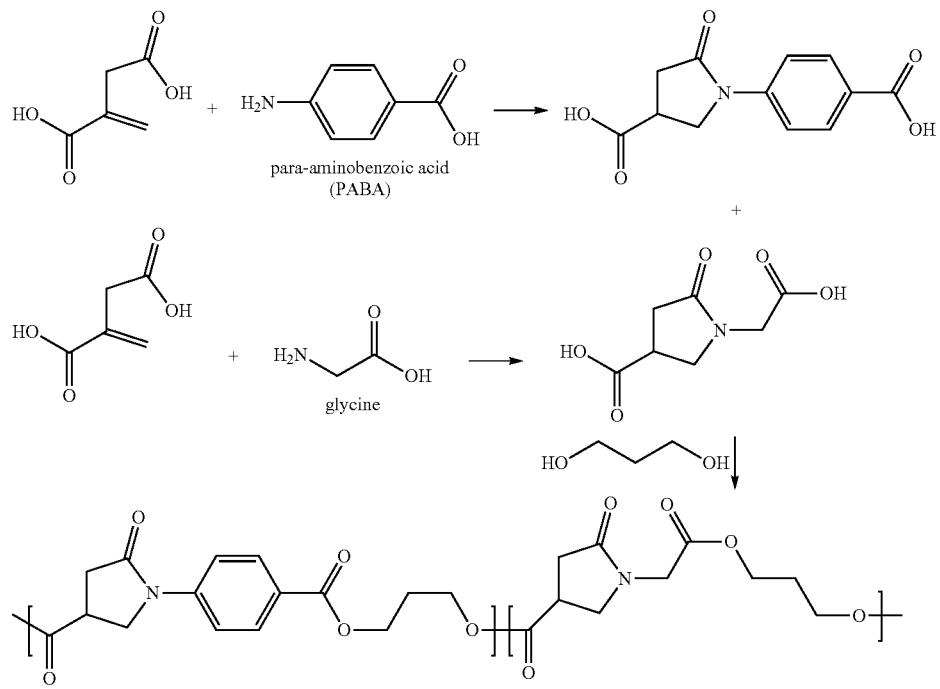

As shown in Reaction Scheme 3, various embodiments relate to co-polymers and methods of producing co-polymers that include a plurality of first monomeric units and a plurality of second monomeric units joined by a plurality of hydrolytically-sensitive ester linkages. Each of the plurality of first monomeric units may be derived from a first monomer. The first monomer may be the product of a reaction between itaconic acid and a first amino acid. Each of the plurality of second monomeric units may be derived from a second monomer. The second monomer may be the product of a reaction between itaconic acid and a second amino acid. The co-polymers may be a product of the reaction of the first monomer and the second monomer in the presence of a diol. The co-polymers may have a glass transition temperature of about 50° C. or greater. 94% or more of the plurality of hydrolytically-sensitive ester linkages may become hydrolyzed after one year of exposure to water, making the co-polymers biorenewable and water-degradable.

According to various embodiments, the first amino acid may be substituted or unsubstituted para-aminobenzoic acid. The second amino acid may be a natural or non-natural substituted or unsubstituted aliphatic amino acid. The second amino acid may be glycine. The diol may be a 1,3-diol, a 1,4-diol, or a-1,5 diol. The diol may be 1,3-propanediol.

The first monomeric unit and the second monomeric unit may be present in a 1:1 ratio. The first monomeric unit and the second monomeric unit may be present in a ratio that is not 1:1. The first amino acid may be para-aminobenzoic acid and the second amino acid may be glycine. The first amino acid may be para-aminobenzoic acid, the second amino acid may be glycine, and the diol may be 1,3-propanediol.

According to various embodiments, a variety of factors may contribute to the high degradability of a polymer. Without wishing to be bound by theory, four theories appear to act crucially in determining the degradation rate. Four different theories of hydrolysis include: steric, hydrolysis, electronic, and biological effect. First of all, the steric effect could decelerate the degradation process by shielding the vulnerable part of the polymer chain. For example, polyglycolic acid (PGA) degrade much faster than PLA, mainly because of the hydrophobic methyl group on the side that blocks the water from getting access to the ester linkage and performing the hydrolysis.

Second, the unusually fast degradation of polymers aforementioned is largely attributed to the hydrophilic nature of pyrrolidone ring, which has been confirmed by the high solubility of NMP and PVP in water. Comparing with other polyesters, the introduction of hydrophilic element into the polymer chain facilitates the degradation by inviting water to the polymer backbone. Aromatic ring, the most commonly used rigid ring structure, could behave disparately based on the chemical environment. For example, when connecting with electron deficient group, such as carbonyl in PET, the aromatic ring shares the electron to neighbor carbon and protects it from nucleophilic attack. On the other hand, when attaching to electron rich group, such as the oxygen in PHFA, the effect is reversed and weakens the ester bond. Last but not least, as most of the plastics discarded in nature are subject to microbial degradation, the rate is highly determined by the structure of the polymer. Lactic acid is chiral, the two enantiomeric forms, L-lactic acid and D-lactic acid, may exist. The polymerizing products of each isomer, poly(L-lactic acid) PLLA and poly(D-lactic acid) PDLA behave diversely under the enzymatic hydrolysis, where the former one degrades much faster than the latter one.

According to various embodiments, the pyrrolidone lactam ring may be incorporated into an aliphatic polyester and this hard/soft motif of the polymer repeat unit was targeted to mimic that of aromatic/aliphatic polymers such as polyethylene terephthalate (PET). Importantly, the hydroxy-acid monomer (HEPC, with one lactam ring) and the diacid monomer (EBPC, with two lactam rings) are synthesized from biogenic itaconic acid, an inexpensive, scalable platform chemical increasingly available via glucose fermentation. The solvent free, melt homopolymerization of HEPC or copolymerization of EBPC with diols is catalyzed by several species, but 2.0 mol % $Sb_2O_3$ afforded the best yields (84-91%) and the highest molecular weights (Mn=19 500-24 900 Da). For these polylactam esters, the lactam:methylene (—$CH_2$—) ratio scaled proportionally to the glass transition temperature (Tg). For the highest ratio of 1:2, the Tg is 60 to 62° C. (FIG. 2, Table 2, entries 1 and 3). For the lowest ratio of 1:4, the Tg is 24° C. (FIG. 2, Table 2, entry 7). Intermediate Tg values were observed for ratios of 1:2.5, 1:3, and 1:3.5 (FIG. 2, Table 2, entries 4, 5, and 6, respectively). Upon exposure to air for one year, polylactam ester molecular weight decreased modestly by about 10%. However, agitation in water fully dissolved the polymers in one month and fully hydrolyzed them to monomers over one year. Hence, these biorenewable polylactam esters show great potential to compete with polylactic acid (PLA) in various dry applications because of their improved thermal properties (Tg of 62 vs. 50° C.) and self-remediation in the environment via facile waterdegradation. Note that PLA is water-insoluble and requires fairly demanding industrial composting conditions for assured degradation.

2-pyrrolidone containing polyesters have shown very promising results regarding to their biorenewability and degradability. This series possesses the potential to represent the future of packaging materials: simple but efficient synthetic route from biorenewable starting materials and self-remediation under environmental conditions upon disposal. According to various embodiments, already discussed, the diacid monomer was synthesized through Michael Addition reaction between itaconic acid and ethylene diamine. Even though itaconic acid is fully biorenewable, mainly harvested from the enzymatic fermentation of glucose, industrial production of ethylene diamine is mainly petrochemical involved—the substitution reaction between ammonia and 1,2-dichloroethane (EDC). As a matter of fact, the whole family of ethyleneamines, such as triethylenetetraamine (TETA), diethylenetriamine (DETA) and aminoethylpiperazine (AEP), are manufactured through the same process, simply by varying the ratio between two reactants. Other methods of manufacturing ethylene diamine with higher renewability are available, involving substituting EDC by ethanolamine or ethylene glycol, as potential bioderived chemicals. However, EDC has dominated the market for decades with its massive annual production and relatively low cost. As the biorenewability was jeopardized by ethylene diamine, the journey of seeking for greener amine resource is inevitable.

According to various embodiments, it is desirable for a greener amine resource to meet various criteria. First, this type of chemical is preferably readily retrievable from nature. Taking the high reactivity of amine function group into consideration, most of the frequently used amino compounds are synthetic and frequently passivated by HCl for the storage and transportation purposes. Furthermore, affordable cost and massive production will be preferred to support the possible scale-up production of derived polymer in the future. For example, itaconic acid, has reached the annual production of 40-80 million tons/year with the price as low as $1.5 USD/kg via fermentation of glucose. Crucially, other functional groups, except for the original amino group, such as hydroxyl or carboxylic acid, are essential to give polymerizable monomers. However, only one of these functional groups present would be ideal to avoid unnecessary crosslinking. Preferentially, this amine source leads to a big family in which a variety of homologues can be selected for the study of structure/properties relationship.

According to various embodiments, a good match of all criteria mentioned above is amino acid. Unlike other amines, the presence of acid group deactivates the amine through the formation of zwitterion. The a-amino acids, with both amine and carboxylic acid groups attached to the same carbon. As the notable branch of amino acids family, the particular significance not only comes from their omnipresence, but also from various functionality and chirality, which lay a solid foundation to the diversity of life. As the most common building blocks in nature, different a-amino acids are connected in a precisely controlled order and converted into a vast array of proteins, fulfilling their specific tasks to support the living of all the organisms on earth. The versatile functionalities of amino acids provides the possibility of synthesizing a series of polymers and comparing their properties.

Because of their distinctive properties, amino acids occupy a key position in different sectors, ranging from animal farming industry as nutrition to poultry, to main ingredients of the products for pharmaceutical and cosmetics company. The increasing demand from the market stimulated their production by the development of advanced technology, especially for those so-called feed amino acids, such as L-lysine, DLmethionine, L-threonine, and L-tryptophan. They take up to 56% of the entire amino acids market, estimated around USD 4.5 billion in 200489. In return, the price dropped towards the affordable end, making it possible to explore the potential application in other fields. Generally speaking, four methods have been applied to amino acid production: extractions from natural resources, direct chemical synthesis, fermentation, and enzyme catalysis. These four processes were chosen based on available technology, costs of raw materials, market prices and sizes, cost of production equipment, and environmental impact of production itself. Extraction from natural resources is the most environmentally friendly and sustainable method of producing amino acids, considering the enormous reserve nature offered. For example, it has been estimated that if 10% of the transportation fuels, mainly from petroleum oil currently, were substituted by that from biomass derivatives, 100 million tons of protein could be generated from this process worldwide annually. Moreover, substantial amounts of protein can also be recovered from wastes in production of food and beverages. However, current extraction technology prevents the production from scaling up and has been superseded by the latter two methods decades ago. The last two biotechnological processes are responsible for the spectacular growth of amino acid production due to their economic and ecological advantages. Fermentation process with high performance strains of bacteria from sugar source has been applied particularly to the production of flavor-enhancers such as glutamate and animal feed amino acids, whereas enzymatic catalysis, as well as whole cell biocatalysts, have been proved especially valuable for nonproteingenic amino acids.

In the last decade, biodegradable polymers containing a-amino acids have been extensively studied, including poly(α-amino acid)s, poly(ester amide)s, and poly(ester ether amide)s, as well as copolymerizations between polypeptides with other biocompatible materials. Most of these materials were targeted for applications in biomedical fields such as drug delivery, gene transfer and tissue engineering. However, very few reports have been found regarding to the applications in other fields such as packaging materials.

Very few reports have been found detailing the reaction between amino acids and itaconic acid and none of them mentioned the polymerization afterwards. In this study, five aliphatic amino acids, L-glycine, L-alanine, Lvaline, L-leucine, and L-iso-leucine, were particularly selected because 1) their hydrocarbon side-chain ruled out the possibility of side reaction; 2) their unique conformation of side-chain enables a detailed study on side-chain/properties relationship. The Michael Addition reaction was carried out with itaconic acid in bulk. Polymerizations were followed with ethylene glycol using the same melt polymerization technique aforementioned. Polymers with high molecular weight were achieved and thermal properties were studied.

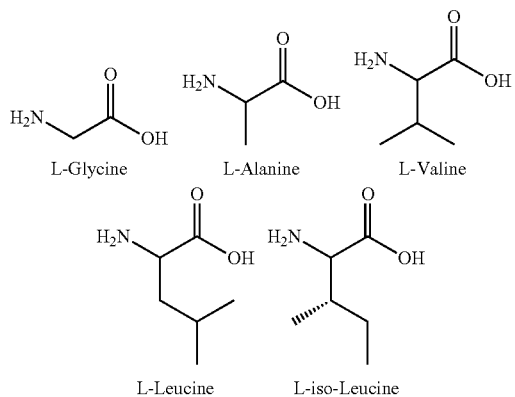

Polymer derived from glycine was chosen as the paradigm for the purpose of reaction optimization and property comparison. Reactions between itaconic acid and different amine, including glycine and alanine may be completed by refluxing two reagents in water for 2 hours and the product was obtained by removing the solvent under reduced pressure. However, both glycine and alanine showed unexpected stability even after refluxing for 24 hours, especially alanine. Several factors may account for the low reactivity. First of all, the zwitterion effect tremendously impaired the reactivity of amine as the nucleophile. By receiving a proton from the acid, the lone pair on the nitrogen was occupied and passivated. Second, the electronic withdrawing effect from carbonyl group nearby further lowered its nucleophilicity by around 6 folds, comparing pKa (in $H_2O$) of protonated amine in glycine (9.8) and in aminoethane (10.6). If using protic solvent, the hydrogen-bonding effect of amine and acid group for both amino acid and itaconic acid firmly held solvent molecules around as "protecting" groups, which left very few opportunities for reactive sites to make contact. Also, alanine was even more stable than glycine probably because of the steric hindrance from extra methyl group on thecenter carbon.

To overcome the difficulties above, different synthetic routes have been designed and tried between itaconic acid and Glycine. At very beginning, glycine methyl ester and dimethyl itaconate were used to replicate the method reported before. Even though the reaction occurred and finished very efficiently, this method was eventually abandoned because of column chromatography purification and complicated esterification of amino acids. Rather than taking this detour, various embodiments focus on optimizing the reaction condition of amino acid and itaconic acid themselves. To break up the zwitterion, 3 equivalents of base were added and reaction was speeded up and completed in 6 hours. After reaction, the product was generated by adding excess amount of acid. Because of the high hydrophilic nature of the product and the impurities, extraction by less polar solvents was a failure. A list of purifications and solvent removals had to be used to get to the pure product with very moderate yield (34%). The last trial was performed by the inspiration of low melting point (162-164° C.) of itaconic acid. On the other hand, decomposition process is also triggered at its melting point. Fortunately, itaconic acid is able to form an eutectic system with amino acids and the mixture started to melt as low as 90° C. Temperature and duration of the reaction was optimized between 130 and 150° C., for 6 hours, respectively. Solvent-free reaction maximized the contact between two reactants. Reaction temperature higher than boiling point of water ensured the instant removal of water to drive the reaction to completion, but lower than 150° C. for the sake of keeping itaconic acid from decomposition. White product was simply obtained by conducting trituration of the yellow crude in Methyl Ethyl Ketone (MEK) overnight with a higher yield of 73%.

Noticeably, before cooling down the completed reaction, removing residue of water from the system by reduced pressure for a short period of time accelerated the purification process, as the selected solvents for trituration were immiscible with water. The rest of the amino acids followed the same reaction methods and are shown in Reaction Scheme 4. Table 3 detailed the reaction conditions of different amino acids and the yield of resulting carboxyalkyl pyrrolidone carboxylic acid (CAPCA). From Entry 1 to 5, as nonpolar side chain of the amino acid grew bigger, more vigorous reaction conditions (the elevation of reaction temperature and reaction time) were required. Selection of trituration solvent also followed the pattern, which leaned towards the non-polar direction (from MEK to diethyl ether).

Table 3 shows exemplary reaction conditions of amino acids and itaconic acid to afford CAPCAs, according to various embodiments.

TABLE 3

Reaction Conditions of amino acids and itaconic acid to afford CAPCAs.

| Entry | Amino acid | Temperature (° C.) | Duration (h) | Trituration solvent | Yield (%) |
|---|---|---|---|---|---|
| 1 | L-Glycine | 130 | 6 | MEK | 73 |
| 2 | L-Alanine | 130 | 6 | Ethyl Acetate | 70 |
| 3 | L-Valine | 140 | 8 | Ethyl Acetate | 74 |
| 4 | L-Leucine | 150 | 8 | Diethyl Ether | 68 |
| 5 | L-iso-Leucine | 150 | 8 | Diethyl Ether | 71 |

The diacid monomers (CAPCA) were subjected to the same two-stage, melt polymerization protocol with ethylene glycol to give polyethylene carboxyalkyl pyrrolidone carboxylate (PECAPC). All of these polymerizations employed the optimal condition from last chapter. The diacid monomer and ethylene glycol were charged in the round bottom flask with a ratio of 1:1.2 under the inert atmosphere. The system was heated up to 180° C. for 4 hours before introducing the dynamic vacuum. An elevation of reaction temperature to 240° C. was applied to assist a viscosity issue the system encountered at the end of the polymerization. As a result, all of the polymers were successfully synthesized with decent number average molecular weights ranging from 15,000 (Entry 5, Table 4) to 35,200 (Entry 2, Table 4) and narrow PDI below 3.

Reaction Scheme 4 shows Itaconic acid reacted with amino acid to afford the monomer CAPCA. Polycondensation with ethylene glycol yielded PECAPC.

Reaction Scheme 4

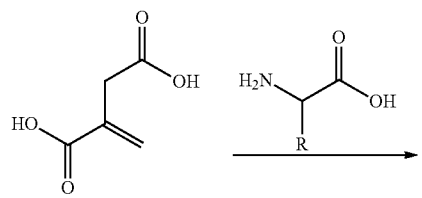

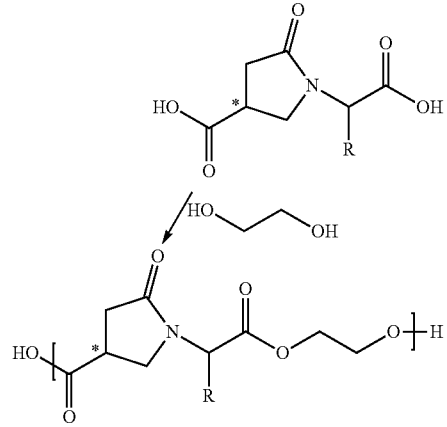

Table 4 also summarizes the polylactam ester thermal properties, as measured by differential scanning calorimetry (DSC) and thermogravimetric analysis (TGA). An interesting trend of Tg was discovered that by exchanging H with alkyl groups differed in length, the glass transition temperature climbed up before rolling down. The highest glass transition temperatures (Tg) of the series belonged to polyethylene carboxylethyl pyrrolidone carboxylate (PECEPC) (61° C., Entry 2, Table 4) and similar Tg was found between polyethylene carboxylmethyl pyrrolidone carboxylate (PECMPC) (55° C., Entry 1, Table 4) and polyethylene carboxylmethyl-iso-propyl pyrrolidone carboxylate (PEC-MPPC) (54° C., Entry 3, Table 4), as well as between polyethylene carboxylmethyl-iso-butyl pyrrolidone carboxylate (PECM-iso-BPC) (47° C., Entry 4, Table 4) and polyethylene carboxylmethyl-sec-propyl pyrrolidone carboxylate (PECMsec- BPC) (48° C., Entry 5, Table 4). Obviously, substituents on the side-chain contributed insignificantly (±8° C.) but differently to Tg of the corresponding polymer. Two effects competed with each other and needed to be considered: degree of conformational restriction and free volume. Glass transition temperature is a kinetic value and highly dependent on polymer chain motion. An elevation of rotational barrier, either by jamming the rotation by a bulky group or stiffening the chain with a rigid group, robs the polymer chain of its "ability to move", whereas importing free volume encourages it. An addition of "soft" groups such as short alkyl group on the side chain could provoke the competition between these two effects, resulting in diverse outcomes. For example, comparing Entry 1(Tg=55° C.) with 2(Tg=61° C.) in Table 4, even though the methyl group brought in more free volume, the noticeable bulkiness constrained the main chain rotation and eventually increased the Tg. The explanation can be applied elsewhere and effectiveness varies, considering the huge difference between polyethylene (Tg<−100° C.) and polypropylene (Tg=0° C.). By adding two extra methyl groups, on the contrary, Tg drops from 61° C. (Entry 2, Table 4) to 54° C. (Entry 2, Table 4) because the free volume overpowered the rotation restriction. The dominance of free volume was also discovered between Entry 3 and Entry 5 in Table 3- 2 where a methyl group was attached to the tail. It was worth mentioning that the competition could be ended up as a tie as well. For example, the effect from free volume and the bulkiness of isopropyl group counteracted with each other (Entry 1, Tg=55° C. vs 3 Tg=54° C. , Table 4). In all, both effects were highly dependent on parent structures and hard to predict. According to DSC, no melting temperatures were observed as well, similar to all polymers analyzed before. In this series, not only did the atacticity of the polymers contribute to the plateau on DSC Thermogram, but also the regioirregularity. During the polymerization step, with negligible difference in reactivity of two carboxylic acid group on both ends, the chances of ethylene glycol connecting to either head or tail were comparative, resulting in the randomness of backbone connection. Finally, Table 4 shows the T50 values for these polylactam esters.

Table 4 shows molecular weight and thermal data for PECAPC made from amino acids of varying side-chains.

Five aliphatic amino acids, L-glycine, L-alanine, L-valine, L-leucine and L-isoleucine, may be included in a series of poly(lactam ester)s, according to various embodiments. Relatively harsh conditions (neat reaction, 130-150° C.) may be applied to the monomer synthesis due to the stability of amino acids. Diacid monomers may be afforded with good yields ranging from 68-74%. Polymers with appreciable molecular weights narrow polydispersity index (PDI) may be obtained. The introduction of amino acids definitely empowered the series of polymers with full biorenewability. Even though the glass transition temperature of the series

TABLE 4

| Entry | Polymers [a] | Amino acid | Yield (%) | $M_n^b$ (Da) | $M_w^b$ (Da) | PDI [b] | $T_g^c$ (° C.) | $T_{50}^d$ (° C.) |
|---|---|---|---|---|---|---|---|---|
| 1 | [structure: pyrrolidone with glycine-derived ester linkage] | L-Glycine | 82 | 25,600 | 44,700 | 2.6 | 55 | 384 |
| 2 | [structure: pyrrolidone with alanine-derived ester linkage] | L-Alanine | 84 | 42,700 | 138,600 | 3.2 | 61 | 383 |
| 3 | [structure: pyrrolidone with valine-derived ester linkage] | L-Valine | 89 | 21,900 | 52,500 | 2.3 | 54 | 372 |
| 4 | [structure: pyrrolidone with leucine-derived ester linkage] | L-Leucine | 80 | 16,700 | 50,300 | 2.6 | 47 | 402 |
| 5 | [structure: pyrrolidone with isoleucine-derived ester linkage] | L-iso-Leucine | 88 | 15,000 | 59,800 | 2.4 | 48 | 402 |

In Table 4, the notation (a) indicates with 2.0 mol % Sb2O3, 180° C. under nitrogen for 4 hours, followed by a temperature ramp over 8 hours to 240° C. with dynamic vacuum. In Table 4, the notation (b) indicates GPC in hexafluoroisopropanol (HFIP) at 40° C. vs. polymethyl methacrylate standards. In Table 4, the notation (c) indicates determined by DSC. In Table 4, the notation (d) indicates TGA temperature at which 50% mass loss was observed under nitrogen.

stays the in the same range, an interesting trend on glass transition temperatures by elongation of the side chain was revealed. The analysis later concluded that a competition between two major contributors was responsible: free volume and conformational barrier, and that the dominance between them was highly unpredictable.

The introduction of the pyrrolidone functional group into the backbone of polyesters apparently improved their thermal stability and limited chain mobility, exceling those of commercially available PLA. The full biorenewability was achieved by the participation of amino acids, one of the most abundant chemical families omnipresent in nature. Various embodiments seek to replicate thermal properties of PET, the most highly produced petrochemical based polyesters in the world. Even though the pyrrolidone-containing polymer is a promising nominee for replacing commodity plastics based on its renewability and degradability, a lack of tolerance under hot working environment could possibly lead to the same embarrassing situation PLA ended up with— tagged with "Cold Usage Only". Stitching bulky substituents to the backbone can result in an increase to Tg by restricting rotation of polymer chain, comparing Polyethylene (Tg=−125° C.) with polypropylene (Tg=0° C.), polyglycolide (Tg=35° C.) with polylactide (Tg=55° C.). However, no significant progress of side-chain effect was observed from amino acid. The entanglement with other counteracting effects, such as free volume, gave rise to the complication in prediction. Various other embodiments involve the incorporation of highly rigid functional group in polymer chain. Aromatic systems enjoy the popularity of promoting various type of polyesters thermally and mechanically, ranging from classic packaging material PET to newly discovered biobased polyethylene furanoate (PEF).

According to various embodiments, the pyrrolidone containing polymer owns high biorenewability and fast environmental remediation, but suffers from moderate thermal behavior; whereas aromatic incorporated one enjoys advanced physical properties, but struggles for immortality. Various embodiments utilize a marriage of pyrrolidone and aromatic moiety to produce renewable and degradable polyesters with high performance. Different bifunctional aromatic amines needed to be located to perform the study. p-phenylenediamine (PPD) may be used as a precursor to polymers, such as commercially available aramid plastics Kevlar® and aromatic polyurethane. The direct attachment of amine to aromatic moiety offered maximized rigidity, laying the solid foundation of extraordinary performance for resulting polymers. As a comparison, p-xylylenediamine (PXD) was also introduced to the system. The extra methylene group between amine and the ring could somewhat soften the polymer and facilitate the processability. However, the issue of reduced biorenewability for both candidates appeared since these aromatic diamines mostly derive from petroleum. For example, PPD was mainly produced from catalytical hydrogenation or by reduction with iron in hydrochloric solution of ρ-nitroaniline. The starting material ρ-nitroaniline was originally synthesized either via the nitration of ρ-nitrochlorobenzene and subsequent amination with aqueous ammonia or directly from aniline via acetylation and nitration.

A variety of aromatic amine sources may be employed. According to various embodiments, ρ-phenylenediamine (PPD), as shown in structure (I) may be an aromatic amine source.

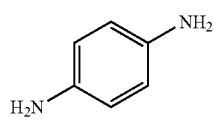
(I)

According to various embodiments, ρ-xylylenediamine (PXD), as shown in structure (II) may be an aromatic amine source.

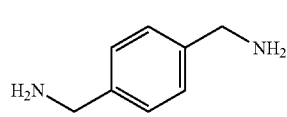
(II)

According to various embodiments, ρ-aminobenzoic acid (PABA), as shown in structure (III) may be an aromatic amine source.

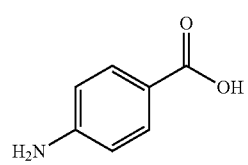
(III)

According to various embodiments, L-phenylalanine (Phe), as shown in structure (IV) may be an aromatic amine source.

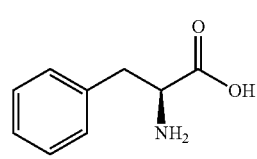
(IV)

A person having ordinary skill in the art will be aware of other possible aromatic amine sources. The specific examples provided are merely exemplary and are not intended to be limiting; any suitable aromatic amine source may be employed.

The majority of a-amino acids may not be desirable for all applications due to their reactive side-chain. According to various embodiments, three aromatic a-amino acids are good candidates, L-phenylalanine, L-tyrosine and Ltryptophan. However, the latter two chemicals can be problematic as the phenol group in L-tyrosine could trigger crosslinking during the polymerization step and nucleophilic 3° carbon on indole group in L-tryptophan might compete with amine group in Michael Addition reaction. According to various embodiments, therefore, relatively inactive L-phenylalanine may be employed as a starting materials. Various embodiments may utilize p-aminobenzoic acid (PABA). Currently, PABA is chemically synthesized from fossil fuel, but it is naturally produced by different microorganisms or plants as the intermediate in the shikimate pathway, a seven step metabolic route to produce aromatic amino acids phenylalanine, tyrosine and tryptophan. This versatile intermediate has been developed and applied to polymer industry as a crosslinking agent for resins and dyes, as well as pharmaceutical industry as a precursor and even as a therapeutic itself because of its biomedical activity (drug POTABA®). Chemical conversion of PABA to terephthalic acid has also been recently demonstrated, providing another biorenewable pathway of manufacturing PET. However, the application of PABA is limited to small scale in plastic and fiber industry, owing to the uncompetitive price to other precursors that are readily available from organic synthesis. With the development of microbial technology, the cost of manufacturing PABA will eventually drop.

According to various embodiments, aromatic poly(ester amide)s may be produced from itaconic acid and four aromatic amines selected before. Four poly(lactam ester)s were synthesized from obtained diacids and 1,3-propanediol. A detailed study of structure/properties relationship was carried out and concluded that properties of resulting polymers varied depending on the position of aromatic ring. The polymer derived from itaconic acid and PABA exhibited excellent thermal and mechanical properties, as well as full biorenewability. A series of polymers with tunable thermal properties were produced by means of employing various aliphatic diols as the comonomer.

Reaction Scheme 5 illustrates an examplary Michael addition reaction between itaconic acid and an aromatic amine, to afford the corresponding diacids, PBPCA.

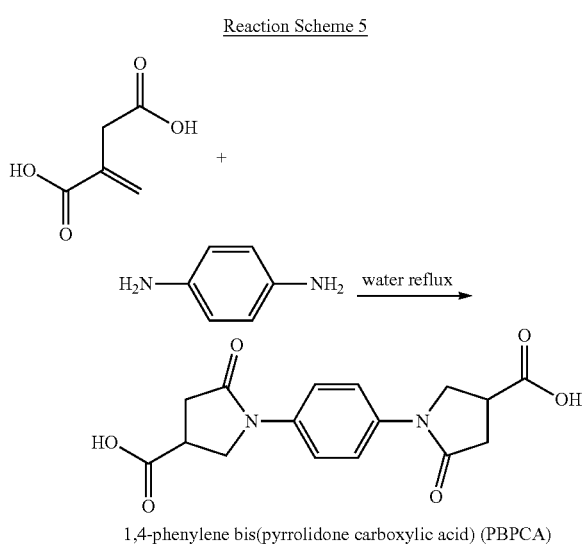

1,4-phenylene bis(pyrrolidone carboxylic acid) (PBPCA)

Reaction Scheme 6 illustrates an examplary Michael addition reaction between itaconic acid and an aromatic amine, to afford the corresponding diacids, XBPCA.

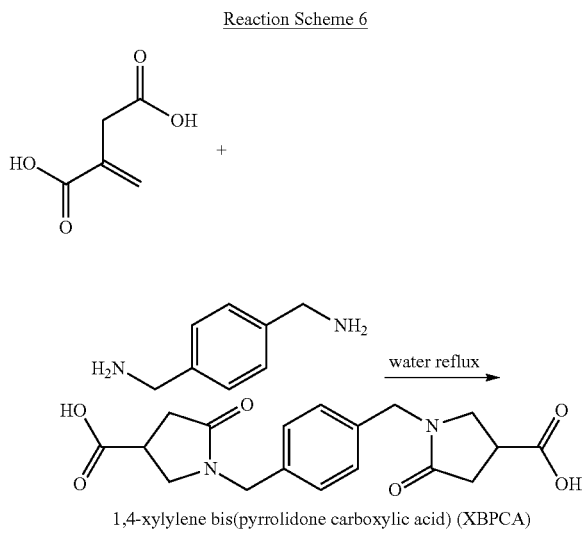

1,4-xylylene bis(pyrrolidone carboxylic acid) (XBPCA)

Reaction Scheme 7 illustrates an examplary Michael addition reaction between itaconic acid and an aromatic amine, to afford the corresponding diacids, CPPCA.

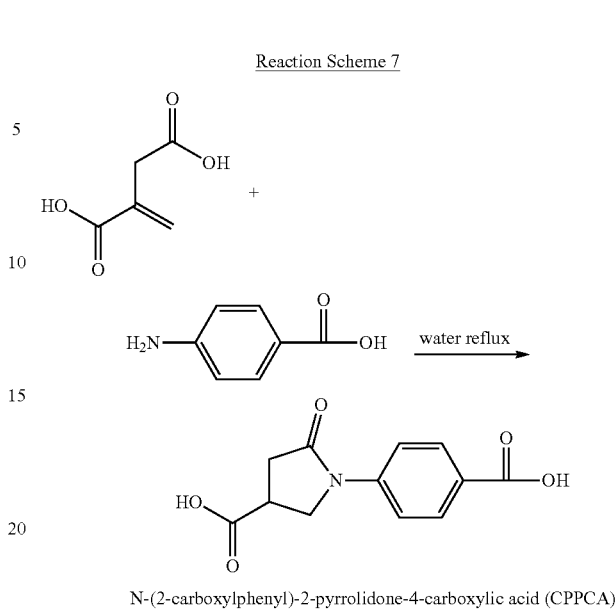

N-(2-carboxylphenyl)-2-pyrrolidone-4-carboxylic acid (CPPCA)

Reaction Scheme 8 illustrates an examplary Michael addition reaction between itaconic acid and an aromatic amine, to afford the corresponding diacids, CPEPCA.

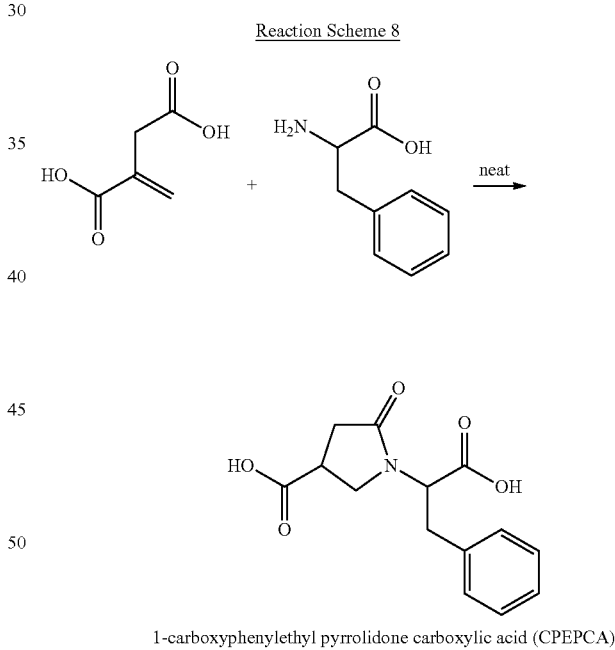

1-carboxyphenylethyl pyrrolidone carboxylic acid (CPEPCA)

Four aromatic amines behaved differently during Michael addition reaction with itaconic acid. Similar reaction condition, refluxing in water, were applied to first three amines (PPD, PXD and PABA), whereas low reactive nature of L-phenylalanine demanded neat reaction at higher temperature. Table 5 summarized the detailed reaction conditions, purification methods and yields. Conveniently, products from PPD and PABA, 1,4-phenylene bis(pyrrolidone carboxylic acid) (PBPCA) and N-(2- carboxylphenyl)-2-pyrrolidone-4-carboxylic acid (CPPCA), respectively, were insoluble in water.

TABLE 5

Reaction and purification details of reaction between itaconic acid and four aromatic amines.

| Entry | Aromatic amines | Reaction condition | Duration (h) | Purification method | Trituration solvent | Yield (%) |
|---|---|---|---|---|---|---|
| 1 | PPD | Water reflux | 6 | Filtration, active charcoal, recrystallization | HCl solution, Water | 66 |
| 2 | PXD | Water reflux | 6 | Solvent removal, Recrystallization | Ethanol | 70 |
| 3 | PABA | Water reflux | 8 | Filtration, trituration | THF | 75 |
| 4 | Phe | Neat (150° C.) | 8 | Trituration | Ethyl Acetate | 71 |

A precipitation was readily obtained after completion of the reaction. Simple filtration and recrystallization led to the pure product. An extra purification of 1,4-phenylene bis (pyrrolidone carboxylic acid) (PBPCA) was required involving active charcoal, which removed darkened impurities formed after exposing PPD to air. Specifically, the purple crude was dissolved in base and active charcoal was introduced to absorb unreacted impurities. The off-white product was regenerated from acidification of the solution and washed with water.

Figure 5:
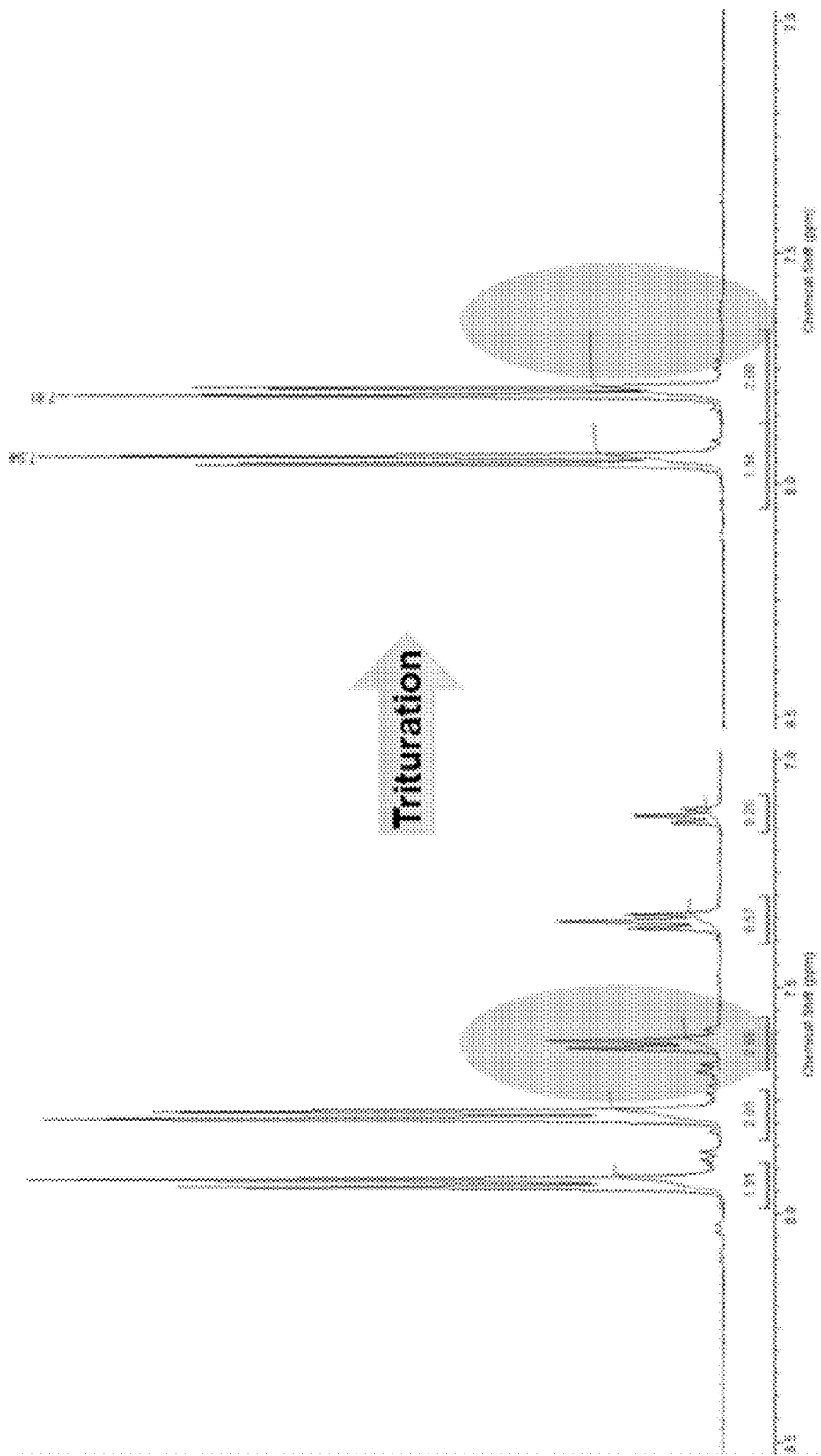
FIG. 5 is a comparison of NMR spectra before and after trituration related to selection of trituration solvent for carboxyl phenyl)-2-pyrrolidone-4-carboxylic acid (CP-PCA)

A set of control experiments was conducted to seek for the best trituration solvent for CPPCA. FIG. 5 is a comparison of NMR spectra before and after trituration and highlighted area was referenced during the selection of trituration solvent for CPPCA. A handful of common solvents were tested. Table 6 elaborated the results in yield, integration value of major impurities on NMR spectrum (highlighted area in FIG. 5) after trituration, as well as the capability of purification (COP) (integration value of removed impurities after trituration over the initial value). COP was designed to determine the capability of a solvent to remove impurities. The yield after purification varied depending on the solvent. In general, a proportional relationship between the loss of yield and COP was discovered. In another word, the more product lost during the trituration, the lower the integration value of impurities would be. It was reasonable considering the nature of trituration required semisolubility of the product. An equilibrium was established between solvent and solutes. Sacrificing a portion of product was essential for dissolving the impurities. At the end, THF stood out with highest COP (87.9%, Entry 5) among others.

TABLE 6

Trituration of CPPCA with selected solvents and their performance.

| Entry[a] | Solvent | Yield (g) | Yield (%) | NMR integration of impurities[b] | NMR integration of removed impurities[c] | COP (%)[d] |
|---|---|---|---|---|---|---|
| 0[e] | — | 2.000 | — | 0.66 | — | — |
| 1 | Water | 1.946 | 97.3 | 0.63 | 0.03 | 4.5 |
| 2 | Methanol | 1.578 | 78.9 | 0.28 | 0.38 | 57.6 |
| 3 | Ethanol | 1.676 | 83.8 | 0.45 | 0.21 | 31.8 |
| 4 | Acetone | 1.723 | 86.2 | 0.44 | 0.22 | 33.3 |
| 5 | THF | 1.591 | 79.6 | 0.08 | 0.58 | 87.9 |
| 6 | Ethyl acetate | 1.531 | 76.6 | 0.35 | 0.31 | 47.0 |

In Table 6, the notation (a) indicates 2.000 grams of crude product and 20 mL of solvent were introduced to a 80 mL beaker covered with aluminum foil and triturated overnight. The product was filtered and dried under reduced pressure. In Table 6, the notation (b) indicates integration value of impurity peak in the aromatic region, referenced on setting integration value of aromatic proton peak as 2. In Table 6, the notation (c) indicates subtraction between initial integration value of impurity peak and that after trituration. In Table 6, the notation (d) indicates integration value of removed impurities over the initial one before trituration. In Table 6, the notation (e) indicates original crude product.

Four diacid monomers were subject to the similar two-stage, melt polymerization protocol developed from Chapter 2 with different aliphatic diols. Surprisingly, all four monomers encountered the same problem during polycondensation with ethylene glycol: the solidification of the mixture occurred immediately after pulling the vacuum at the beginning of second step. The elevation of temperature to as high as 250° C. failed to melt the hard rock but only darkened it. The product resisted to dissolve in any common solvents, even those with high boiling point, such as Dimethylsulfoxide (DMSO), N, N-dimethylformamide (DMF) and N-methyl-2-pyrrolidone (NMP). It was concluded that the obtained hard materials were only oligomerized, since no glass transition temperature (Tg) was found in any of the DSC Thermograms. The problem was bypassed by switching to 1,3-propanediol. Polypropylene N-(2-carboxylphenyl)-2- pyrrolidone-4-carboxylate (PPCPPC) was selected as the paradigm poly(ester amide) for the study of polymerization optimization (Table 7). By copying the polymerization protocol from previous two chapters, a low molecular weight polymer (Mn=5,200 Da, PDI=2.6) was collected with very moderate yield (Entry 1, Table 7). After polymerization, the neck of the round bottom flask was covered with a relatively thick layer of white compound, which was later identified as the mixture of monomeric and dimeric material via sublimation under extreme conditions. These unreacted starting materials indicated the incompletion of reaction in the first step. Extension of reaction time (Entry 3) under Nitrogen facilitated the oligomerization more efficiently than the elevation of reaction temperature (Entry 2). However, the molecular weight was still within the oligomer range. A closer observation of the reaction pointed out the change of viscosity towards the end of the stage, which might hold the primary responsibility to the incompletion. A considerable increase of molecular weight (Mn=23,400 Da) was eventually achieved with an extra temperature ramp towards the end of first step (3rd column in Table 7). Further prolonging the ramping (Entry 6) did not improve the polymerization results.

TABLE 7

Condition for polymerizing CPPCA with 1,3-propanediol.

| Entry | Nitrogen t (h) | Nitrogen T (° C.) | t (h) | T (° C.) | Vacuum t | T (° C.) | Mn[a] (Da) | PDI[a] | Yield (%) |
|---|---|---|---|---|---|---|---|---|---|
| 1 | 4 | 180 | — | — | 8 | 240 | 5,200 | 2.6 | 63 |
| 2 | 4 | 200 | — | — | 8 | 240 | 5,900 | 3.5 | 66 |
| 3 | 8 | 180 | — | — | 8 | 240 | 9,800 | 2.5 | 73 |
| 4 | 8 | 200 | — | — | 8 | 240 | 15,300 | 3.0 | 76 |
| 5 | 8 | 200 | 4 | 220 | 8 | 240 | 23,400 | 2.3 | 90 |
| 6 | 8 | 200 | 8 | 220 | 8 | 240 | 23,700 | 3.7 | 85 |

In Table 7, the notation (a) indicates GPC in hexafluoroisopropanol (HFIP) at 40° C. vs. polymethyl methacrylate standards.

The adjusted protocol was successfully implemented to the rest of polymerizations (Reaction Schemes 9, 10, 11, and 12). As shown in Table 8, all ten polymers were collected in good yields (82 to 90%) with appreciable molecular weights. Mn values ranged from 16,600 to 32,800 and the typical polydispersity index (PDI) values for step-growth polymerizations, ranging from 2.3 to 3.7. All ten polymers showed enhanced thermal stability, exhibiting a 50% mass loss under nitrogen at temperatures from 393 to 426° C. Apparently, the existence of aromatic moiety gave rise to high resistance to heat. For polypropylene 1,4-phenylene bis(pyrrolidone carboxylate) (PPPBPC) from PBPC and polypropylene 1,4-xylylene bis(pyrrolidone carboxylate) (PPXBPC) from XBPCA, their intractability in GPC solvent prevented access to their molecular weights.

Reaction Scheme 9 is an exemplary synthesis route for diacid, PPBCA, to the polymer, PPPPBC, according to various embodiments.

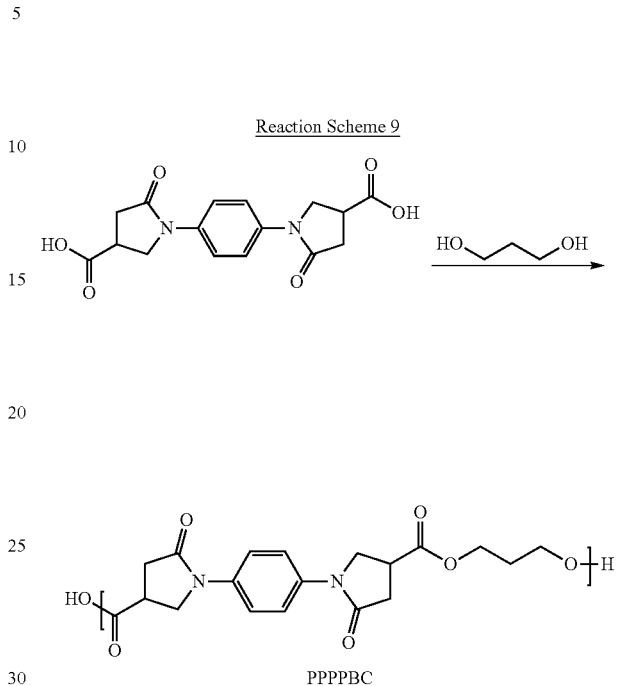

Reaction Scheme 9

PPPPBC

Reaction Scheme 10 is an exemplary synthesis route for diacid, XPBCA, to the polymer, PPXPBC, according to various embodiments.

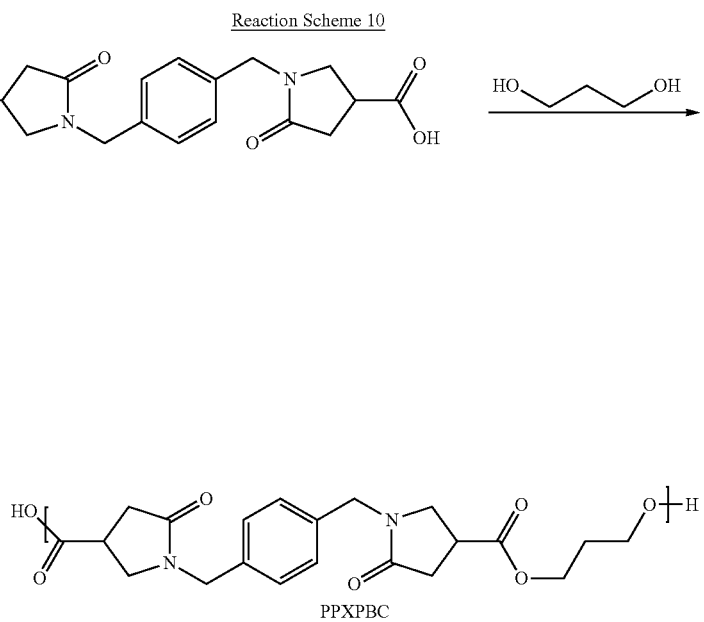

Reaction Scheme 10

PPXPBC

Reaction Scheme 11 is an exemplary synthesis route for diacid, CPPCA, to the polymer, PACPPC, according to various embodiments.

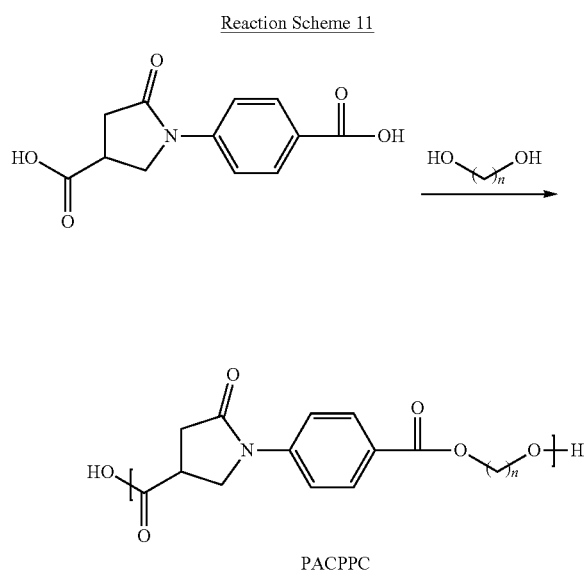

PACPPC

Reaction Scheme 12 is an exemplary synthesis route for diacid, CPEPCA, to the polymer, PPCPEPC, according to various embodiments.

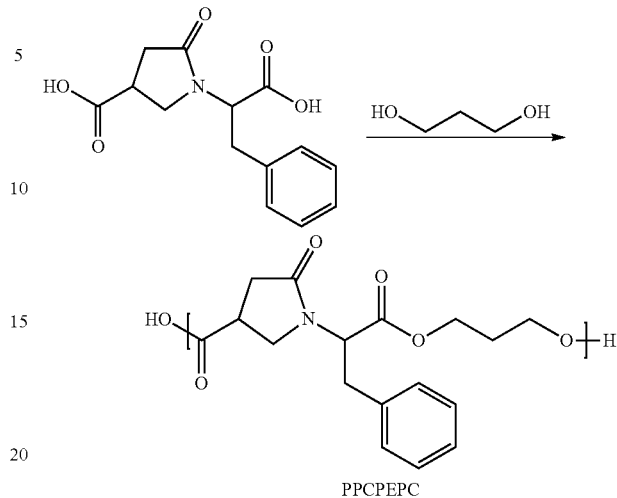

PPCPEPC

As recorded in Table 8, PPPBPC (Entry 1), PPXBPC (Entry 2), PPCPEPC (Entry 3) and PPCPPC (Entry 4) exhibited different thermal behaviors depending on the number of pyrrolidone groups per unit, the position of aromatic ring, as well as the number of methylene spacers in the backbone.

Table 8 shows molecular weight and thermal data for PPPBPC (Entry 1), PPXBPC (Entry 2), PPCPEPC (Entry 3), as well as PACPPC polymers made from diols of varying length (Entries 4-10).

TABLE 8

| Entry | Polymers | Yield (%) | $M_n{}^b$ (Da) | $M_w{}^b$ (Da) | PDI$^b$ | $T_g{}^c$ (° C.) | $T_{50}{}^d$ (° C.) |
|---|---|---|---|---|---|---|---|
| 1 | [structure] | 87 | —$^e$ | —$^e$ | —$^e$ | 112 | 426 |
| 2 | [structure] | 82 | —$^e$ | —$^e$ | —$^e$ | 80 | 395 |

TABLE 8-continued
| Entry | Polymers | Yield (%) | $M_n{}^b$ (Da) | $M_w{}^b$ (Da) | PDI${}^b$ | $T_g{}^c$ (° C.) | $T_{50}{}^d$ (° C.) |
|---|---|---|---|---|---|---|---|
| 3 | 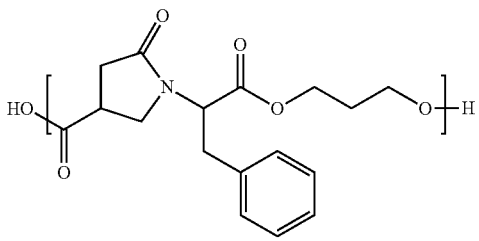 | 82 | 23,700 | 65,500 | 2.8 | 48 | 395 |
| 4 | 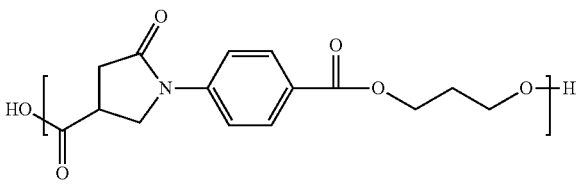 | 90 | 23,400 | 53,800 | 2.3 | 96 | 393 |
| 5 | 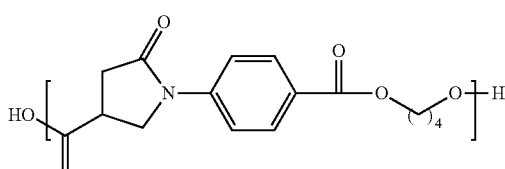 | 86 | 19,500 | 50,700 | 2.6 | 90 | 400 |
| 6 | 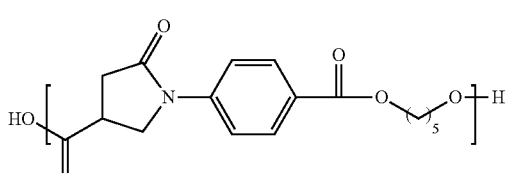 | 88 | 23,400 | 58,500 | 2.5 | 66 | 400 |
| 7 | 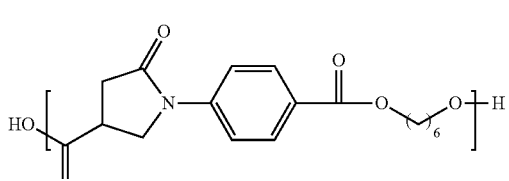 | 84 | 16,600 | 56,400 | 3.4 | 60 | 395 |
| 8 | 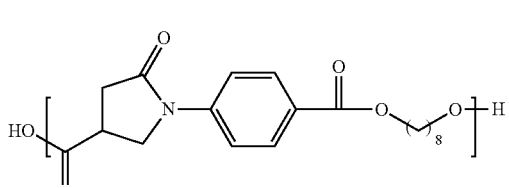 | 84 | 17,600 | 45,800 | 2.6 | 46 | 397 |
| 9 | 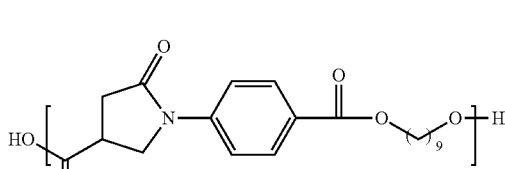 | 87 | 17,100 | 39,300 | 2.3 | 41 | 395 |

TABLE 8-continued

| Entry | Polymers | Yield (%) | $M_n{}^b$ (Da) | $M_w{}^b$ (Da) | PDI$^b$ | $T_g{}^c$ (°C.) | $T_{50}{}^d$ (°C.) |
|---|---|---|---|---|---|---|---|
| 10 | [structure] | 89 | 32,800 | 121,400 | 3.7 | 34 | 400 |

In Table 8, the notation (a) indicates with 2.0 mol % Sb2O3, 180° C. under nitrogen for 4 hours, followed by a temperature ramp over 8 hours to 240° C. with dynamic vacuum. In Table 8, the notation (b) indicates GPC in hexafluoroisopropanol (HFIP) at 40° C. vs. polymethyl methacrylate standards. In Table 8, the notation (c) indicates determined by DSC. In Table 8, the notation (d) indicates TGA temperature at which 50% mass loss was observed under nitrogen. In Table 8, the notation (e) indicates insolubility of the polymers prevented GPC analysis.

Figure 6:
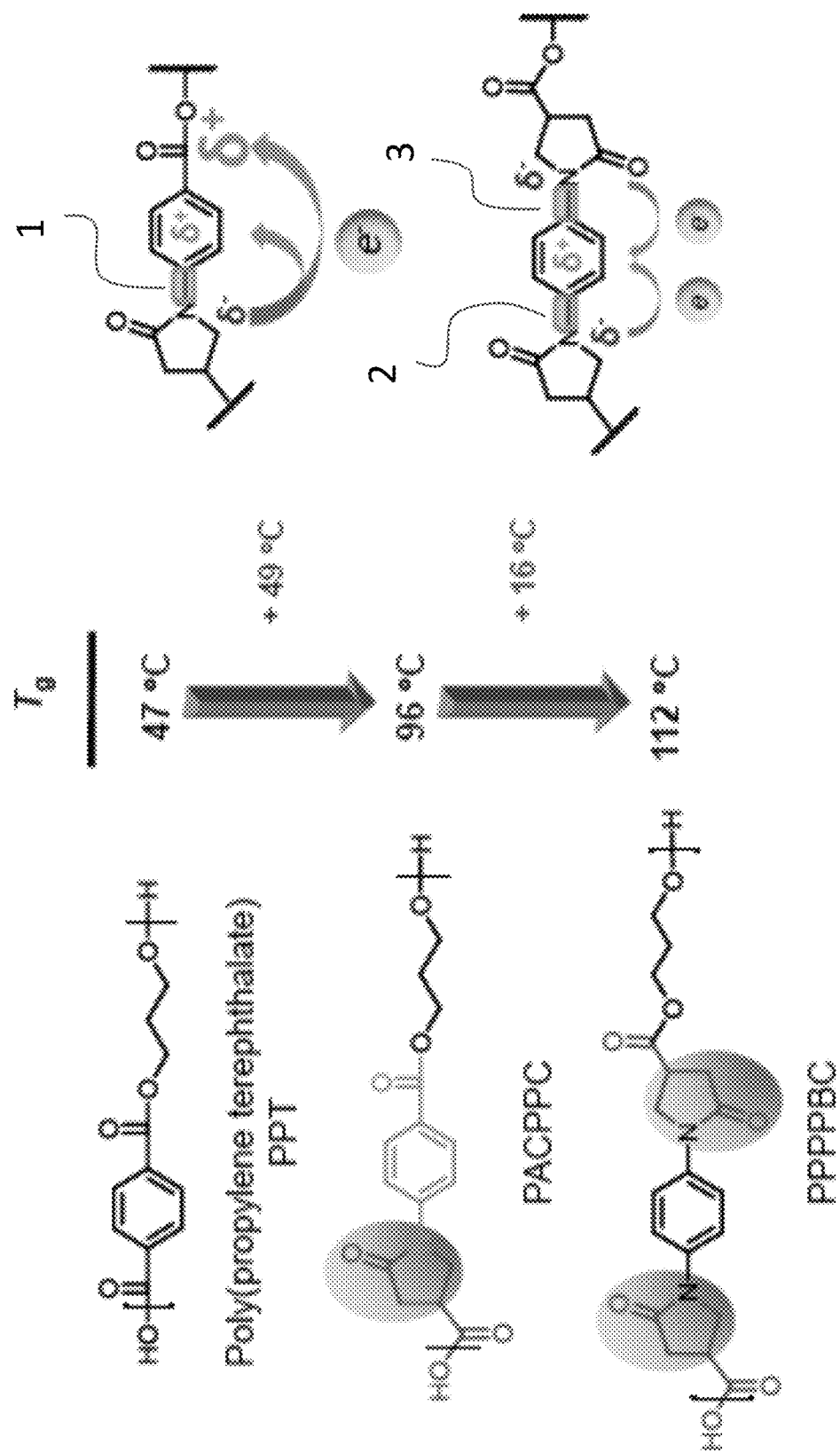
FIG. 6 is a schematic illustration of an example showing the glass transition temperature (Tg) of PPT, PACPPC and PPPPBC, as well as its improvement by adding pyrrolidone group between carboxylate and benzene, according to various embodiments.

FIG. 6 is a schematic illustration of an example showing the glass transition temperature (Tg) of PPT, PACPPC and PPPPBC, as well as its improvement by adding pyrrolidone group between carboxylate and benzene, according to various embodiments. The pyrrolidone group influenced the glass transition temperature of the polymer (FIG. 6). Polypropylene terephthalate (PPT), the commercially available engineering plastics was selected as the basis (Tg=47° C.). The insertion of one pyrrolidone group between carbonyl group and ring gave PPCPPC (Tg=96° C., Entry 4, Table 8) and two gave PPPBPC (Tg=112° C., Entry 1, Table 4- 4), The nonlinear trend was discovered as the first introduction of pyrrolidone skyrocketed the glass transition temperature by 49° C. (Δ=96° C.-47° C.), whereas the additional one only experienced a moderate increase (Δ=16° C.=112° C.-96° C.). An abnormal increase by adding the second pyrrolidone ring between the carbonyl and aromatic may be observed. Without wishing to be bound by theory, on the right side of FIG. 6, the insignificant increase is attributed to the diminished double bond character between nitrogen and carbon in the aromatic moiety at bond 1, bond 2, and bond 3. The double bond character may determine the conformational barrier of the backbone, which, as a result, affects the glass transition temperature. As the first pyrrolidone group is introduced, both aromatic ring and its adjacent carbonyl group withdrew the electron from nitrogen, forced the nitrogen distributing more electrons to the N—C on its right, and increase the double bond character of that bond. On the other hand, the introduction of second pyrrolidone shared the liability, which was no longer as big as the previous one, because of the absence of carbonyl group. Thus, the double bond character was diminished and flexibility was brought to the polymer backbone.

Figure 7:
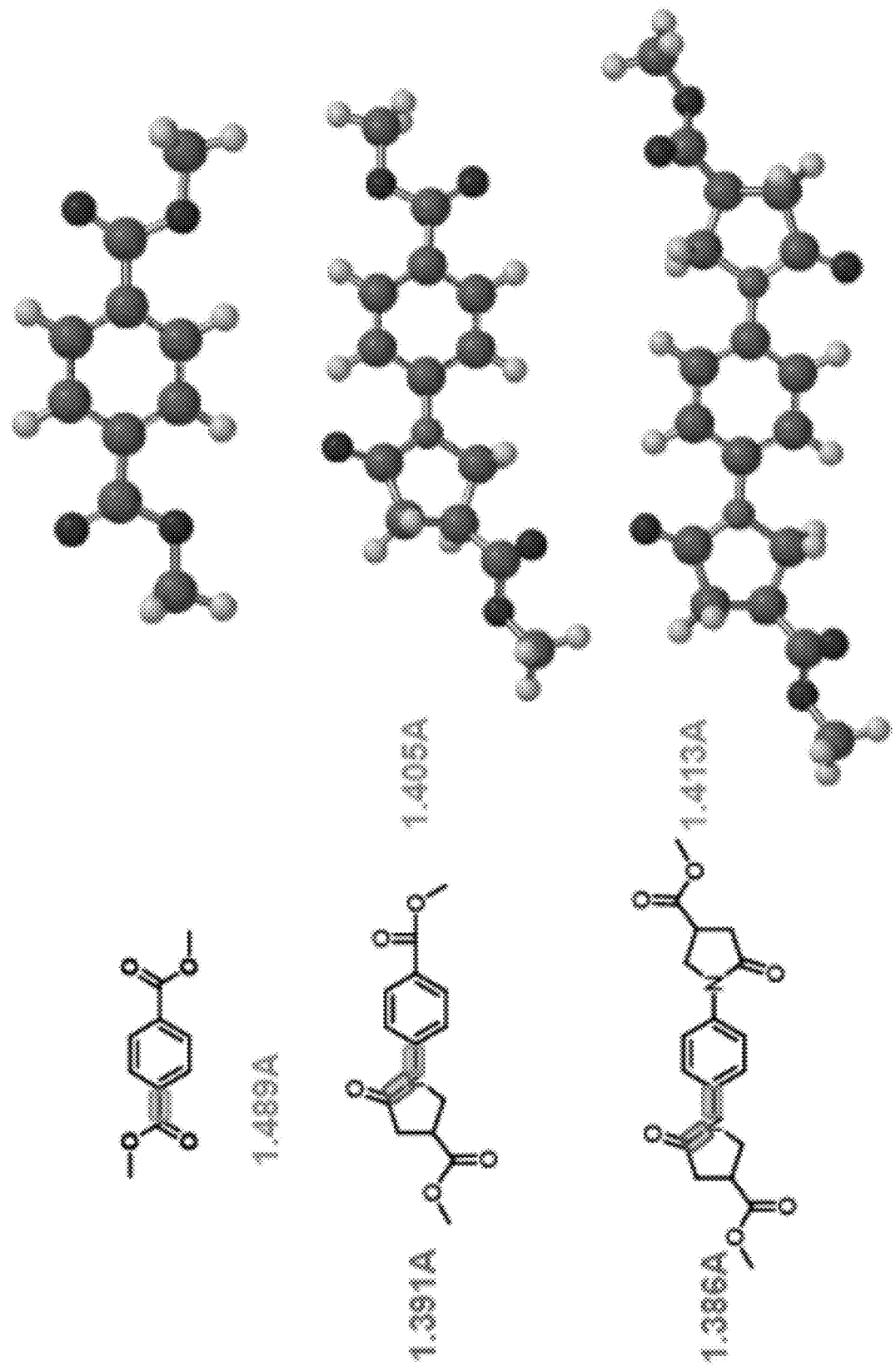
FIG. 7 is a schematic illustration showing bond lengths of C—C between carbonyl and aryl group in dimethyl terephthalate, of N-aryl (orange) and of amide bond (blue) in dimethyl N-(2- carbocylphenyl)-2-pyrrolidone-4-carboxylate and dimethyl 1,4-phenylene bis(pyrrolidone carboxylate), according to various embodiments.

FIG. 7 is a schematic illustration showing bond lengths of C—C between carbonyl and aryl group in dimethyl terephthalate, of N-aryl (orange) and of amide bond (blue) in dimethyl N-(2- carbocylphenyl)-2-pyrrolidone-4-carboxylate and dimethyl 1,4-phenylene bis(pyrrolidone carboxylate), according to various embodiments. The theory was confirmed by calculating the lengths of C—N bond using Spartan (FIG. 7). Since the calculation of polymer can be time consuming and problematic, a simplified calculation was achieved by using the dimethyl ester homologues of PPT, PACPPC and PPPPBC. The three molecules were minimized by DFT B3LYP 6-31G* and bond lengths were calculated and compared. When introducing the second pyrrolidone to the backbone, the bond length of N-aryl (orange) increased from 1.405 Å to 1.413 Å, whereas the amide bond (blue) shrank from 1.391 Å to 1.386 Å. As bond length is inversely proportional to the double bond character, the extended bond lengths indicated the decrease of double character.

Figure 8:
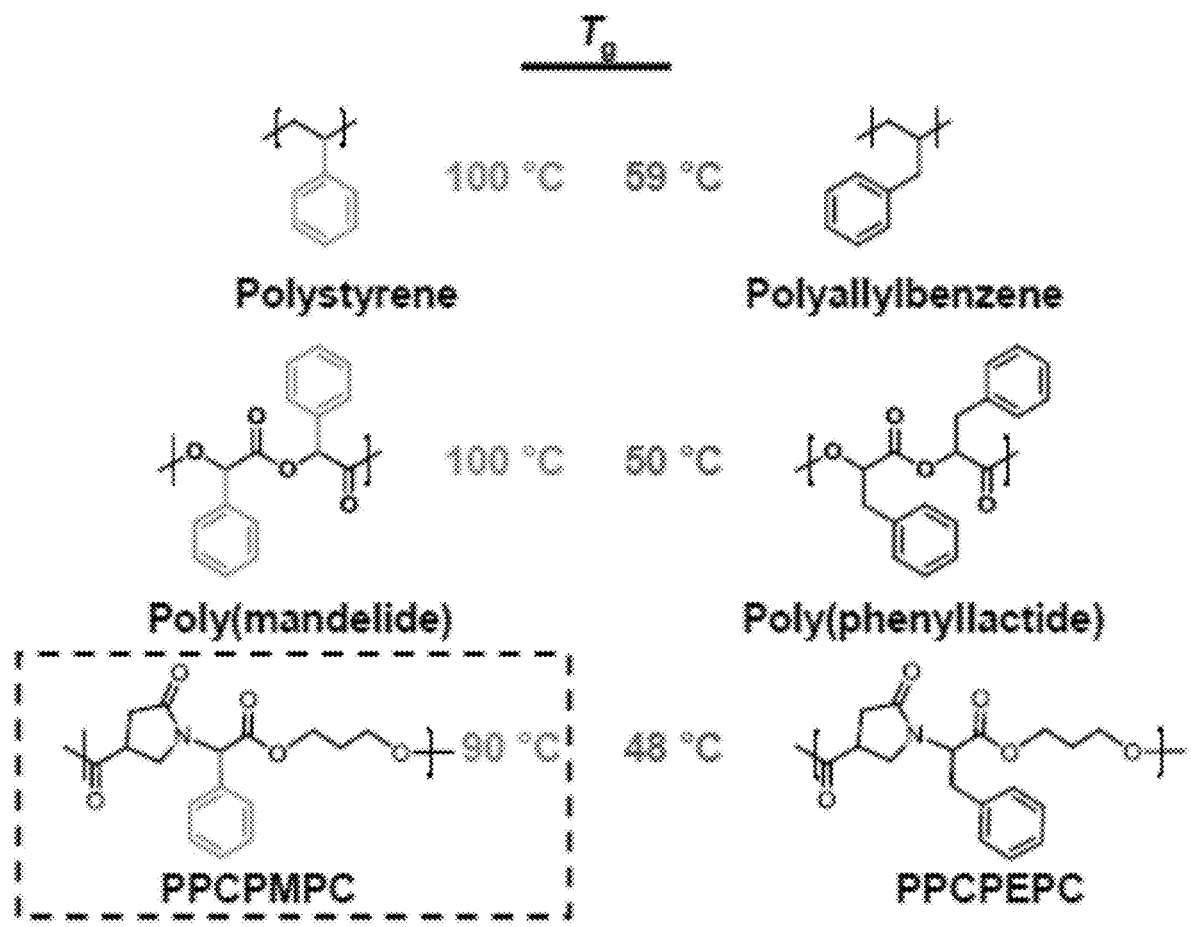
FIG. 8 is a schematic illustration showing glass transition temperature (Tg) comparisons between polystyrene and polyallylbenzene, polymandelide and polyphenyllactide, and PPCPMPC and PPCPEPC, according to various embodiments.

FIG. 8 is a schematic illustration showing glass transition temperature (Tg) comparisons between polystyrene and polyallylbenzene, polymandelide and polyphenyllactide, and PPCPMPC and PPCPEPC, according to various embodiments. For PPCPEPC, analyzing its DSC Thermogram was surprising, because, it was expectiEd that the Tg should fall into the same range of the other three aromatic polymers. Learning from the difference between PPPBPC and PPXBPC (Entry 1 and 2, Table 8), the possible suspects were narrowed to the methylene spacer connecting aromatic to polymer backbone (FIG. 8). Unfortunately, a purification problem during the monomer synthesis between itaconic acid and phenylglycine prevented production of Polypropylene 1-carboxyphenylmethyl pyrrolidone carboxylate (PPCPMPC) and making direct comparisons. However, evidence from polystyrene/polyallylbenzene and poly(mandelide)/poly(phenyllactide) was captured. It has been reported that both polyallylbenzene (Tg=59° C.) and poly (phenyllactide) (Tg=50° C.) suffered from tremendous loss of Tg by adding one methylene spacer to their twin brother polystyrene (Tg=100° C.) and poly(mandelide) (Tg=100° C.). For the latter two polymers, their high Tgs were mainly resulted from steric effect of aromatic side-chain directly attached to the backbone. The conformational tension was largely relieved by installing the universal rotator—the methylene spacer. It was predicted that the Tg of PPCPMPC might be also as close as 90° C.

Lastly, the effect of methylene spacers in the backbone was studied. For PPPBPC (Entry 1, Table 8) and PPXBPC (Entry 2, Table 8), the extra methylene spacer between pyrrolidone and aromatic dragged glass transition temperature considerably down from 112° C. to 80° C. To further explore the trend of this impact, a series of PAPCPPC polymers was synthesized with diols of various number of methylene spacers (Entries 4-10, Table 8). The glass transition temperatures of these polymers were measured to establish the structure/properties relationship. Tg gradually decreased with each additional methylene group, except for a precipitous drop of 24° C. (66 =90° C. -66° C.), detected from n=4 (Entry 5, Table 8) to n=5 (Entry 6, Table 8). The general effect of polymer structure on the glass transition temperature followed predictions. As the increasing number of methylene spacers joined the polymer backbone, the polymer acquired more conformational flexibility. Thus, the long-range motions can be "activated" at lower temperature. With the help of various aliphatic diols, various embodiments are able to tune the thermal properties of obtained polymers in the range from 34° C. to 96° C., which covered a large portion of packaging materials, including PS, PET and PLA, illustrated in FIG. 7. Meanwhile, the aliphatic series was also plotted to demonstrate the enhancement of thermal properties from aromatic. The glass transition temperature of aliphatic series enjoyed as much as 51° C. (n=4, FIG. 7) increase after the collaboration with aromatic system. The overall notable promotion explained the essential role aromatic system played in high performance materials.

Figure 9:
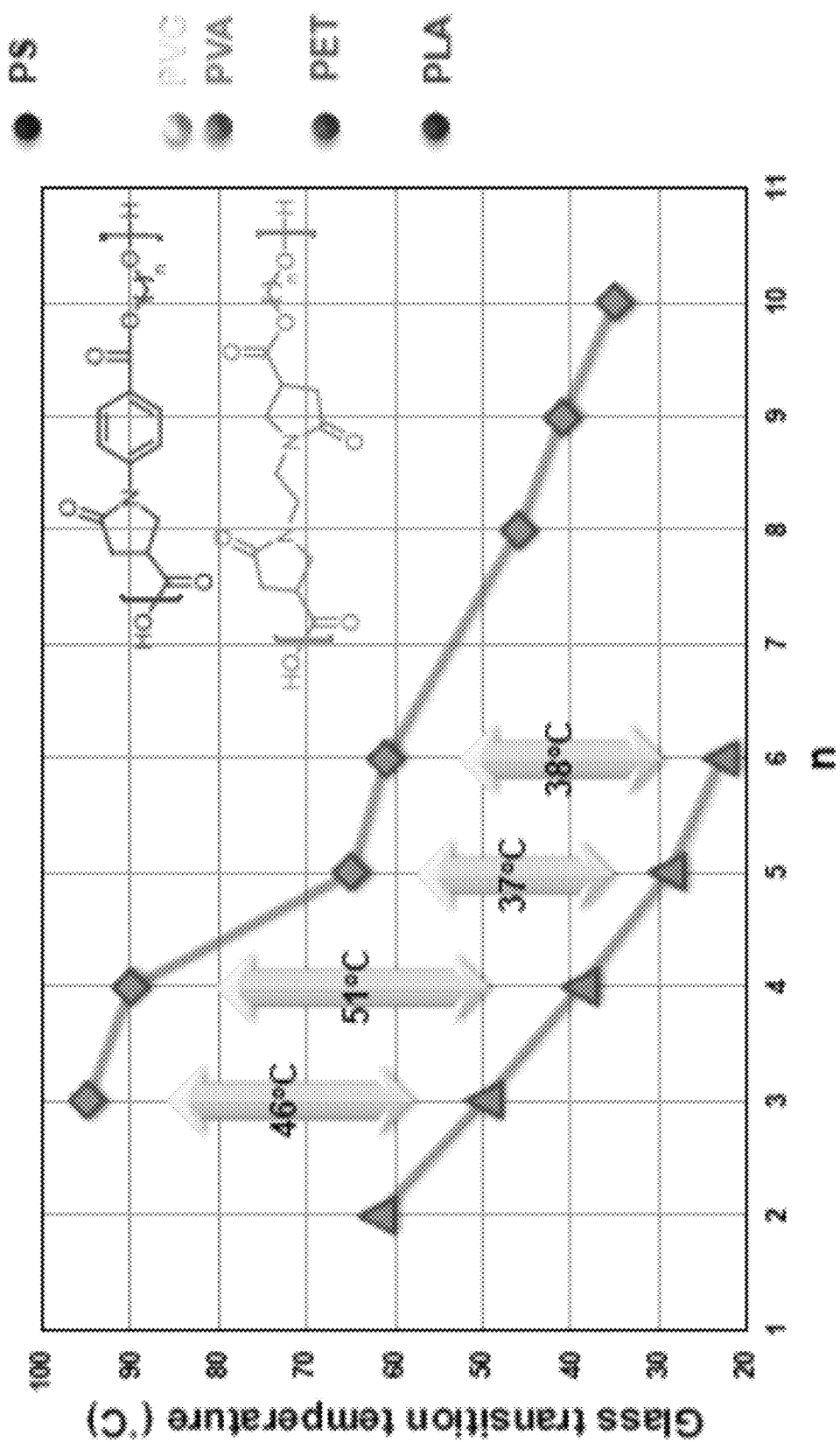
FIG. 9 is an annotated chart illustrating a comparison of glass transition temperature between aliphatic, aromatic series of poly(ester amide)s and common commodity plastics in the market.

FIG. 9 is an annotated chart illustrating a comparison of glass transition temperature between aliphatic, aromatic series of poly(ester amide)s and common commodity plastics in the market.

With full biorenewability and comparable thermal properties to commodity plastics, mechanical properties of some of the PAPCPPC series were studied. The preliminary result was promising with PPPCPPC, the one with shortest methylene spacers (n=3). Table 9 shows mechanical properties of PPPCPPC compared to mechanical properties of commercially-available polyethylene terephthalate (PET) and polystyrene (PS). Table 9 concluded the three mechanical parameters, tensile strength at yield of PPPCPPC and they were compared with those of the petroleum-based counterparts, PS and PET.

TABLE 9

| Polymer | Tensile Strength (MPa) | Elongation at Break (%) | Modulus (GPa) |
|---|---|---|---|
| PPPCPPC* | 59 | 126 | 2.6 |
| PET | 55 | 125 | 2.7 |
| PS | 40 | 7 | 3.0 |

One of the most important and widely measured properties of materials in structural application is tensile strength, which indicates the ability to resist breaking under tensile stress. The tensile strength, measures the maximum stress that a material can withstand while being stretched before break. Elongation at break is the percentage increase before breaking under tension, which, similarly, expresses the capability of a material to resist change of shape without crack formation. The modulus represents the ratio of stress to elastic stain in tension. A high modulus means that the material is rigid, as more stress is required to produce a given number of strain. The three materials in the table possess similar tensile strengths (40-59 MPa) and modulus (2.6-3.0 GPa), whereas a significant difference of elongation at break is observed between PS (7%) and the other two (125% and 126%). As the combination of ultimate tensile strength and elongation at break defines the toughness of a material, it is conclusive that PPPCPPC enjoys similar toughness of PET, which outweighs that of PS. A comparison within the series of PAPCPPC will be performed after the results of the rest of PAPCPPC with methylene spacers of 4, 5 and 6 were obtained.

According to various embodiments, four different aromatic amines, PPD, PXD, PABA and Phe, have been imported to synthesize corresponding diacid monomers with itaconic acid (PBPCA, XBPCA, CPPCA and CPEPCA, respectively), and their polymers (PPPBPC, PPXBPC, PPCPPC and PPCPEPC, respectively) with 1,3-propanediol. Thermal properties of these four polymers differed significantly depending on the number of pyrrolidone group attached to the aromatic moiety, position of the aromatic ring, and the number of methylene spacers in the backbone. Because of the excellent biorenewability of PABA and great performance of its derived polymer, the study was expanded to its whole series by taking advantage of aliphatic diols with varying length. This series of polymers exhibited tunable thermal properties covering the range of quite a few common commodity packaging materials. Furthermore, the preliminary test results indicated the comparable mechanical properties of PPCPEPC with commercially available PET and excelled that of PS. The full biorenewability, tunable thermal properties, and comparable mechanical behaviors, unveils the great competitiveness of this series polymers with incumbent petroleum-based counterparts.

EXAMPLES

While embodiments of the present disclosure are described in connection with the Examples and the corresponding text and figures, there is no intent to limit the invention to the embodiments in these descriptions. On the contrary, the intent is to cover all alternatives, modifications, and equivalents included within the spirit and scope of embodiments of the present disclosure.

Examples 1-8

Itaconic acid (99%) was purchased from Alfa Aesar and used without further purification. Ethanolamine (99%), Ethylene diamine (redistilled, 99.95+%), 1,3-propanediol (99.60+%), 1,4-butanediol (99%), 1,5-pentanediol (99%) and 1,6-hexanediol (99%) were bought from Sigma-Aldrich and used as received. Antimony Oxide ($Sb_2O_3$, 99.5%), the catalyst for polymerization, was purchased from Acros and used as received without any purification. Ethylene glycol, deionized water, acetone and concentrated aqueous HCl solution were purchased from Fisher Scientific. NMR solvents, including deuterated dimethyl sulfoxide (DMSO-$d_6$) and deuterium oxide ($D_2O$), were purchased from Cambridge Isotope Laboratories. All other chemicals, unless expressly mentioned, were utilized as received.

Proton and carbon nuclear magnetic resonance ($^1$H and $^{13}$C NMR) spectra were recorded using an Inova 500 MHz spectrometer. Chemical shifts are reported in parts per million (ppm) downfield relative to tetramethylsilane (TMS, 0.0 ppm) or residual proton and carbon in the specified solvent. Coupling constants (J) are reported in Hertz (Hz). Multiplicities are reported using the following abbreviations: s, singlet; d, doublet; t, triplet; q, quartet; quin, quintet; m, multiplet; br, broad.

Differential scanning calorimetry thermograms were obtained with a DSC Q1000 from TA instruments. About 3-5 mg of each sample were massed and added to a sealed pan that passed through a heat/cool/heat cycle at 10° C./min. Reported data are from the second full cycle. The temperature ranged from −50 to 200° C., depending on the samples.

Thermogravimetric analyses were measured under nitrogen with a TGA Q5000 from TA Instruments. About 5-10 mg of each sample were heated at 20° C./min from 25 to 600° C.

Gel permeation chromatography (GPC) was performed at 40° C. using an Agilent Technologies 1260 Infinity Series liquid chromatography system with an internal differential refractive index detector, and a PL HFIP gel column (7.5 mm i.d., 300 mm length) using a solution of 0.1% potassium triflate (K(OTf)) in HPLC grade hexafluoroisopropanol (HFIP) as the mobile phase at a flow rate of 0.3 mL min-1. Calibration was performed with narrow polydispersity polymethyl methacrylate (PMMA) standards.

Polymerizations were usually performed in a 25 mL round bottom flask, which was connected to a rotary evaporation bump trap, and together linked to a vacuum line. With this setup water, as the byproduct of condensation, can be collected and seen in the bump trap. Furthermore, all other volatile compounds could be removed without further treatment.

Example 1

The purpose of this example is to illustrate the preparation of the monomer, N-(2-hydroxyethyl)-2-pyrrolidone-4-carboxylic acid(HEPC):

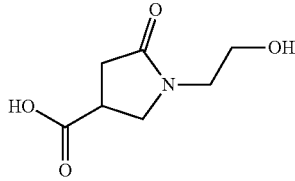 [SMILES: O=C(O)C1CC(=O)N(CCO)C1]

13.01 g (100.0 mmol) of itaconic acid was dissolved in 100 mL of water. 6.64 mL (110.0 mmol) of ethanolamine was added dropwise to the solution with continuous stirring. The mixture was refluxed overnight and cooled down to room temperature. After removing most of the solvent by rotary evaporation, ethanol was added and a white product started to precipitate. After filtration, the raw product was recrystallized in ethanol and dried under vacuum with a yield of 71%. $^1$H NMR (500 MHz, DMSO- $d_6$): δ ppm 12.65 (br, $^1$H), 4.71 (br, $^1$H), 3.63 (t, J=9.4 Hz, $^1$H), 3.53 (dd, J=9.8, 6.1 Hz, $^1$H), 3.47 (t, J=5.8 Hz, 2H), 3.27-3.14 (m, 3H), 2.44 (t, J=7.3 Hz, 2H). $^{13}$C NMR (125 MHz, DMSO-$d_6$): δ ppm 175.0, 172.4, 58.9, 49.9, 45.0, 36.0, 34.0.

Example 2

The purpose of this example is to illustrate the preparation of the monomer, Ethylene bis(pyrrolidone carboxylic acid) (EBPC):

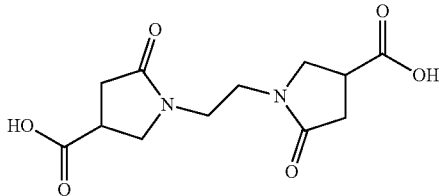 [SMILES: O=C(O)C1CC(=O)N(CCN2CC(C(=O)O)CC2=O)C1]

13.01 g (100.0 mmol) of itaconic acid was dissolved in 100 mL of water. 3.67 mL (55.0 mmol) of ethylene diamine was syringed out from the bottle and then added dropwise to the solution with continuous stirring. The mixture was refluxed overnight and cooled down to room temperature. The yellow product started to precipitate after removing three quarters of the solvent by rotary evaporation. 0.5 M of cold aqueous HCl solution was added to wash the product three times. The white powder was obtained by filtration and dried, affording a yield of 78%. $^1$H NMR (500 MHz, DMSO-$d_6$): major diastereoisomer (1) (55%): δ ppm 12.61 (br, 2H), 3.58 (dd, J=10.0, 10 Hz, 2H), 3.51-3.37 (m, 4H), 3.27-3.17 (m, 2H), 3.17-3.06 (m, 2H), 2.45-2.33 (m, 4H); minor diastereoisomer (2) (45%): δ ppm 12.61 (br, 2H), 3.55 (dd, J=10.0, 10 Hz, 2H), 3.51-3.37 (m, 4H), 3.27-3.17 (m, 2H), 3.17-3.06 (m, 2H), 2.45-2.33 (m, 4H). $^{13}$C NMR (125 MHz, DMSO- $d_6$): δ ppm 174.3, 172.3, 48.2, 38.8, 35.5, 33.4.

Example 3

The purpose of this example is to illustrate the preparation of the preparation of Poly(ethylene pyrrolidone carboxylate) (PEPC):

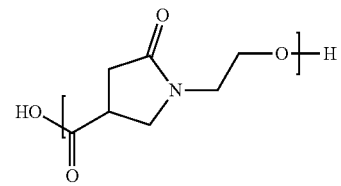

1.73 g (10.0 mmol) of monomer and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a milky white polymer in 84.3% yield. $^1$H NMR (500 MHz, DMSO- $d_6$): δ ppm 4.18 (t, J=5.2 Hz, 2H), 3.62 (t, J=9.0 Hz, $^1$H), 3.53 (dd, J=9.8, 5.6 Hz, $^1$H), 3.44 (s, 2H), 3.27 (p, J=7.8 Hz, $^1$H), 2.56-2.38 (m, 2H). $^{13}$C NMR (125 MHz, DMSO- $d_6$): δ 172.7, 172.2, 61.6, 48.5, 40.8, 35.4, 33.1.

Example 4

The purpose of this example is to illustrate the preparation of the preparation of Polyethylene/[ethylene bis(pyrrolidone carboxylate)]:

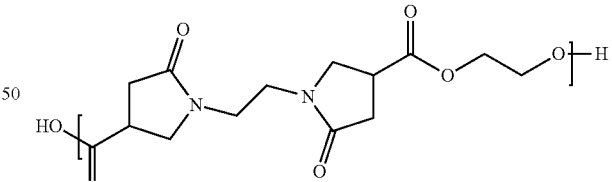

2.843 g (10.0 mmol) of ethylene bis(pyrrolidone carboxylic acid), 0.745 g (12.0 mmol) of ethylene glycol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 88.3% yield. $^1$H NMR (500 MHz, DMSO $d_6$): δ ppm 4.29 (s, 4H), 3.61 (q, J=8.7 Hz, 2H), 3.52-3.43 (m, 2H), 3.39 (d, J=9.4 Hz, 2H), 3.29-3.18 (m, 4H), 2.48-2.34 (m, 4H). $^{13}$C NMR (125 MHz, DMSO- d$_6$): δ ppm 172.7, 172.1, 62.5, 47.9, 38.7, 35.4, 33.2.

Example 5

The purpose of this example is to illustrate the preparation of the preparation of Polypropylene/[ethylene bis(pyrrolidone carboxyl ate)]:

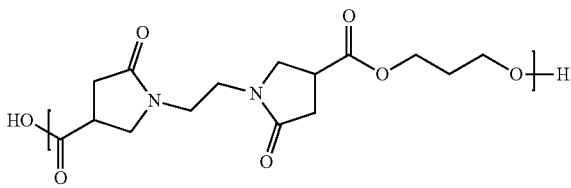

2.843 g (10.0 mmol) of ethylene bis(pyrrolidone carboxylic acid), 0.837 g (11.0 mmol) of 1,3-propanediol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 89.8% yield. $^1$H NMR (500 MHz, DMSO d$_6$): δ ppm 4.14 (t, J=6.4 Hz, 4H), 3.60 (q, J=9.3 Hz, 2H), 3.51-3.42 (m, 2H), 3.37 (d, J=9.5 Hz, 2H), 3.29-3.18 (m, 4H), 2.49-2.34 (m, 4H), 1.94 (t, J=6.4 Hz, 2H). $^{13}$C NMR (125 MHz, DMSO- d$_6$): δ ppm 172.7, 172.1, 61.4, 48.0, 38.7, 35.4, 33.2, 27.4.

Example 6

The purpose of this example is to illustrate the preparation of the preparation of Polybutylene/[ethylene bis(pyrrolidone carboxylate)]:

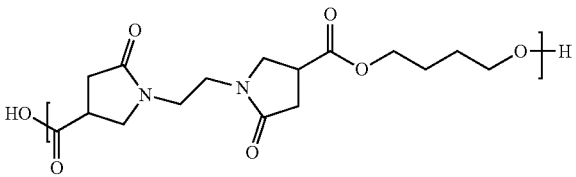

2.843 g (10.0 mmol) of ethylene bis(pyrrolidone carboxylic acid), 0.991 g (11.0 mmol) of 1,4-butanediol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 87.6% yield. $^1$H NMR (500 MHz, DMSO d$_6$): δ 4.09 (s, 4H), 3.60 (q, J=9.6 Hz, 2H), 3.54-3.42 (m, 2H), 3.38 (d, J=9.7 Hz, 2H), 3.29-3.16 (m, 4H), 2.49-2.29 (m, 4H), 1.65 (s, 4H). $^{13}$C NMR (125 MHz, DMSO- d$_6$): δ ppm 172.7, 172.1, 64.2, 48.0, 38.7, 35.4, 33.2, 24.6.

Example 7

The purpose of this example is to illustrate the preparation of the preparation of Polypentylene/[ethylene bis(pyrrolidone carboxyl ate)]:

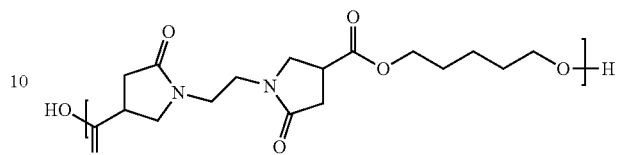

2.843 g (10.0mmol) of ethylene bis(pyrrolidone carboxylic acid), 1.094 g (10.5 mmol) of 1,5-heptanediol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 90.8% yield. $^1$H NMR (500 MHz, DMSO d$_6$): δ ppm 4.06 (t, J=6.5 Hz, 4H), 3.60 (q, J=9.3 Hz, 2H), 3.51-3.43 (m, 2H), 3.38 (d, J=9.5 Hz, 2H), 3.28-3.15 (m, 4H), 2.49-2.30 (m, 4H), 1.61 (quint, J=7.0 Hz, 4H), 1.36 (quint, J=7.4 Hz, 2H). $^{13}$C NMR (125 MHz, DMSO- d$_6$): δ ppm 172.7, 172.1, 64.4, 48.0, 38.8, 35.5, 33.24, 27.6, 21.8.

Example 8

The purpose of this example is to illustrate the preparation of the preparation of Polyhexylene/[ethylene bis(pyrrolidone carboxylate)]:

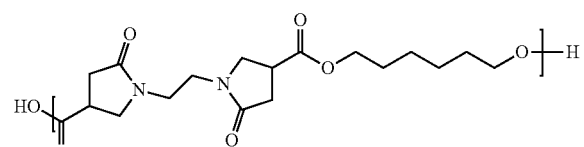

2.843 g (10.0 mmol) of ethylene bis(pyrrolidone carboxylic acid), 1.241 g (10.5 mmol) of 1,6-hexanediol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 86.2% yield. $^1$H NMR (500 MHz, DMSO d$_6$): δ ppm 4.04 (t, J=6.6 Hz, 4H), 3.59 (q, J=9.2 Hz, 2H), 3.49-3.41 (m, 2H), 3.37 (d, J=9.4 Hz, 2H), 3.27-3.14 (m, 4H), 2.46-2.30 (m, 4H), 1.57 (t, J=6.7 Hz, 4H), 1.31 (s, 4H). $^{13}$C NMR (125 MHz, DMSO- d$_6$): δ ppm 172.7, 172.1, 64.5, 48.0, 38.7, 35.5, 33.2, 27.9, 24.9.

Examples 9-17

Itaconic acid (99%) was purchased from Alfa Aesar and used without further purification. L-Glycine, L-Alanine, L-Valine, L-Leucine and L-iso-Leucine were purchased from BulkSupplements on Amazon and used as received. Antimony Oxide ($Sb_2O_3$, 99.5%), the catalyst for polymerization, was purchased from Acros and used as received without any purification. Ethylene glycol, Methyl Ethyl Ketone, Ethyl Acetate and Diethyl Ether were purchased from Fisher Scientific. NMR solvents, including deuterated dimethyl sulfoxide (DMSO-$d_6$) and deuterium oxide ($D_2O$), were purchased from Cambridge Isotope Laboratories. All other chemicals, unless expressly mentioned, were utilized as received.

Proton and carbon nuclear magnetic resonance ($^1H$ and $^{13}C$ NMR) spectra were recorded using an Inova 500 MHz spectrometer. Chemical shifts are reported in parts per million (ppm) downfield relative to tetramethylsilane (TMS, 0.0 ppm) or residual proton and carbon in the specified solvent. Coupling constants (J) are reported in Hertz (Hz). Multiplicities are reported using the following abbreviations: s, singlet; d, doublet; t, triplet; q, quartet; quin, quintet; m, multiplet; br, broad.

Differential scanning calorimetry thermograms were obtained with a DSC Q1000 from TA instruments. About 3-5 mg of each sample were massed and added to a sealed pan that passed through a heat/cool/heat cycle at 10° C./min. Reported data are from the second full cycle. The temperature ranged from −50 to 200° C., depending on the samples.

Thermogravimetric analyses were measured under nitrogen with a TGA Q5000 from TA Instruments. About 5-10 mg of each sample were heated at 20° C./min from 25 to 600° C.

Gel permeation chromatography (GPC) was performed at 40° C. using an Agilent Technologies 1260 Infinity Series liquid chromatography system with an internal differential refractive index detector, and a PL HFIP gel column (7.5 mm i.d., 300 mm length) using a solution of 0.1% potassium triflate (K(OTf)) in HPLC grade hexafluoroisopropanol (HFIP) as the mobile phase at a flow rate of 0.3 mL min-1. Calibration was performed with narrow polydispersity polymethyl methacrylate (PMMA) standards.

The polymerizations were usually performed in a 25 mL round bottom flask, which was connected to a rotary evaporation bump trap, and together linked to a vacuum line. With this setup water, as the byproduct of condensation, can be collected and seen in the bump trap. Furthermore, all other volatile compounds could be removed without further treatment.

Example 9

The purpose of this example is to illustrate the preparation of the monomer, 1-carboxymethyl pyrrolidone carboxylic acid (CMPC):

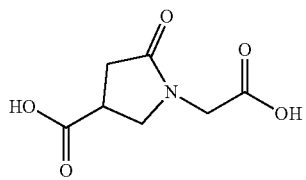 [SMILES: O=C(O)CN1CC(C(=O)O)CC1=O]

1.301 g (10.0 mmol) of itaconic acid and 0.751 g (10.0 mmol) of L-Glycine were charged in a 25 mL round bottle flask under nitrogen atmosphere with continuous stirring. The mixture was heat up to 130° C. for 6 hours. After reaction completed, the system was subjected to dynamic vacuum for half an hour before cooling down. 20 Ml methyl ether ketone was added to the yellow crude and triturated overnight. White precipitate formed and vacuum filtration was conducted. The obtained solid was washed with 10 mL of ethyl acetate three times. White powder was eventually collected and dried under vacuum with a yield of 73%. $^1H$ NMR (500 MHz, DMSO-$d_6$): δ ppm 12.74 (br, 2H), 3.92 (s, 2H), 3.63 (t, J=9.4 Hz, $^1H$), 3.55 (dd, J=9.8, 6.1 Hz, $^1H$), 3.24 (m, $^1H$), 2.50 (t, J=7.3 Hz, 2H). $^{13}C$ NMR (125 MHz, DMSO-$d_6$): δ ppm 174.4, 172.6, 170.1, 49.2, 43.5, 35.5, 33.0.

Example 10

The purpose of this example is to illustrate the preparation of the monomer, 1-carboxyethyl pyrrolidone carboxylic acid (CEPC):

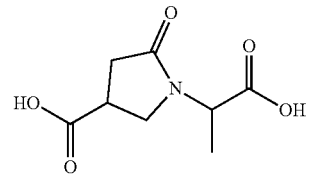

1.301 g (10.0 mmol) of itaconic acid and 0.891 g (10.0 mmol) of L-Alanine were charged in a 25 mL round bottle flask under nitrogen atmosphere with continuous stirring. The mixture was heat up to 130° C. for 6 hours. After reaction completed, the system was subjected to dynamic vacuum for half an hour before cooling down. 20 mL ethyl acetate was added to the yellow crude and triturated overnight. White precipitate formed and vacuum filtration was conducted. The obtained solid was washed with 10 mL of diethyl ether three times. White powder was eventually collected and dried under vacuum with a yield of 70%. $^1H$ NMR (500 MHz, DMSO-$d_6$): δ ppm 12.80 (br, 2H), 4.52 (dd, J=9.3, 5.9 Hz, $^1H$), 3.62 (t, J=9.4 Hz, $^1H$), 3.50 (dd, J=9.8, 6.1 Hz, $^1H$), 3.22 (m, $^1H$), 2.50 (m, 2H), 1.31 (d, J=7.3 Hz, 3H). $^{13}C$ NMR (125 MHz, DMSO-$d_6$): δ ppm 174.2, 172.5, 172.3, 49.0, 45.6, 35.6, 33.4, 14.5.

Example 11

The purpose of this example is to illustrate the preparation of the monomer, 1-carboxymethyl-iso-propyl pyrrolidone carboxylic acid (CMPPC):

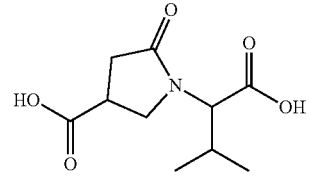 [SMILES: CC(C)C(C(=O)O)N1CC(C(=O)O)CC1=O]

1.301 g (10.0 mmol) of itaconic acid and 1.172 g (10.0 mmol) of L-Valine were charged in a 25 mL round bottle flask under nitrogen atmosphere with continuous stirring. The mixture was heat up to 140° C. for 8 hours. After reaction completed, the system was subjected to dynamic vacuum for half an hour before cooling down. 20 mL ethyl acetate was added to the yellow crude and triturated overnight. White precipitate formed and vacuum filtration was conducted. The obtained solid was washed with 10 mL of diethyl ether three times. White powder was eventually collected and dried under vacuum with a yield of 74%. $^1$H NMR (500 MHz, DMSO-$d_6$): δ ppm 12.73 (br, 2H), 4.14 (d, J=9.8 Hz, $^1$H), 3.62 (t, J=9.4 Hz, $^1$H), 3.57 (m, $^1$H), 3.22 (m, $^1$H), 2.50 (m, 2H), 2.09 (m, $^1$H), 0.93 (d, J=6.4 Hz, 3H), 0.81 (d, J=6.8 Hz, 3H). $^{13}$C NMR (125 MHz, DMSO-$d_6$): δ ppm 174.7, 173.0, 171.7, 60.3, 46.4, 36.1, 33.7, 27.5, 19.8, 19.4.

Example 12

The purpose of this example is to illustrate the preparation of the monomer, 1-carboxymethyl-iso-butyl pyrrolidone carboxylic acid (CM-iso-BPC):

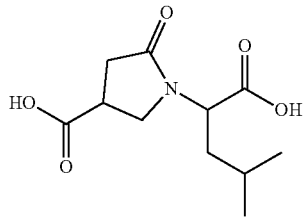 [SMILES: CC(C)CC(C(=O)O)N1CC(C(=O)O)CC1=O]

1.301 g (10.0 mmol) of itaconic acid and 1.312 g (10.0 mmol) of L-Leucine were charged in a 25 mL round bottle flask under nitrogen atmosphere with continuous stirring. The mixture was heat up to 150° C. for 8 hours. After reaction completed, the system was subjected to dynamic vacuum for half an hour before cooling down. 20 mL diethyl ether was added to the yellow crude and triturated overnight. White precipitant formed and vacuum filtration was conducted. The obtained solid was washed with 10 mL of diethyl ether three times. White powder was eventually collected and dried under vacuum with a yield of 68%. $^1$H NMR (500 MHz, DMSO-$d_6$): δ ppm 12.76 (br, 2H), 4.54 (m, 1H), 3.62 (t, J=9.4 Hz, 1H), 3.53 (m, 1H), 3.22 (m, 1H), 2.50 (m, 2H), 1.72 (t, J=10.3 Hz, 1H), 1.56 (t, J=10.5 Hz, 1 H), 1.42 (m, 1 H), 0.90 (d, J=6.2 Hz, 3H), 0.83 (d, J=6.8 Hz, 3H). $^{13}$C NMR (125 MHz, DMSO-$d_6$): δ ppm 174.5, 172.7, 173.4, 51.4, 45.3, 36.6, 35.5, 33.4, 24.1, 23.0, 20.8.

Example 13

The purpose of this example is to illustrate the preparation of the monomer, 1-carboxymethyl-sec-butyl pyrrolidone carboxylic acid (CM-sec-BPC):

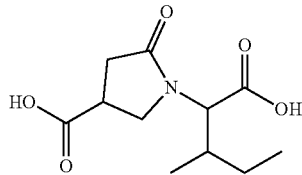 [SMILES: CCC(C)C(C(=O)O)N1CC(C(=O)O)CC1=O]

1.301 g (10.0 mmol) of itaconic acid and 1.312 g (10.0 mmol) of L-iso-Leucine were charged in a 25 mL round bottle flask under nitrogen atmosphere with continuous stirring. The mixture was heat up to 150° C. for 8 hours. After reaction completed, the system was subjected to dynamic vacuum for half an hour before cooling down. 20 mL diethyl ether was added to the yellow crude and triturated overnight. White precipitant formed and vacuum filtration was conducted. The obtained solid was washed with 10 mL of diethyl ether three times. White powder was eventually collected and dried under vacuum with a yield of 68%. $^1$H NMR (500 MHz, DMSO-d6): δ ppm 12.74 (br, 2H), 4.23 (m, 1H), 3.64 (t, J=9.4 Hz, 1H), 3.55 (m, 1H), 3.22 (m, 1H), 2.51 (m, 2H), 1.91 (m, 1 H), 1.33 (m, 1 H), 1.00 (m, 1 H), 0.89 (d, J=6.5 Hz, 3H), 0.84 (m, 3H). $^{13}$C NMR (125 MHz, DMSO-d6): δ ppm 174.2, 172.5, 171.3, 58.3, 45.9, 35.6, 32.7, 24.6, 15.4, 10.9, 10.4.

Example 14

The purpose of this example is to illustrate the preparation of Polyethylene1-carboxymethyl pyrrolidone carboxylic acid (PECMPC):

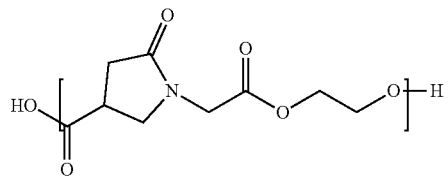

1.872 g (10.0 mmol) of 1-carboxymethyl pyrrolidone carboxylic acid, 0.745 g (12.0 mmol) of ethylene glycol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 82% yield. $^1$H NMR (500 MHz, DMSOd$_6$): δ ppm 4.32 (s, 4H), 4.06 (s, 2H), 3.65 (s, 1 H), 3.57 (s, 1 H) 3.39 (m, 1H), 2.51(m, 4H). 13C NMR (125 MHz, DMSO-$d_6$): δ ppm 172.6, 172.4, 168.4, 62.5, 48.8, 43.3, 35.3, 32.7.

Example 15

The purpose of this example is to illustrate the preparation of Polyethylene1-carboxyethyl pyrrolidone carboxylic acid (PECEPC):

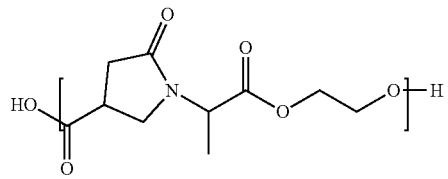

2.012 g (10.0 mmol) of 1-carboxyethyl carboxylic acid, 0.745 g (12.0 mmol) of ethylene glycol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 84% yield. ¹H NMR (500 MHz, DMSOd₆): δ ppm 4.63 (m, 1 H), 4.29 (s, 4H), 3.65 (s, 1 H), 3.55 (s, 1 H) 3.36 (m, 1H), 2.57(m, 4H), 1.33 (d, J=6.8 Hz, 3H). 13C NMR (125 MHz, DMSO-d₆): δ ppm 172.6, 172.4, 168.4, 62.5, 59.0, 45.6, 35.6, 33.4, 14.5.

Example 16

The purpose of this example is to illustrate the preparation of Polyethylene1-carboxy-iso-propyl pyrrolidone carboxylic acid (PECPPC):

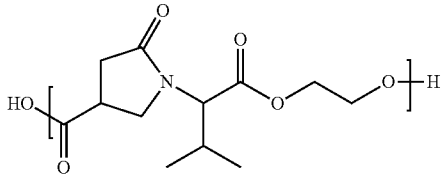

2.293 g (10.0 mmol) of 1-carboxy-iso-propyl pyrrolidone carboxylic acid, 0.745 g (12.0 mmol) of ethylene glycol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 84% yield. ¹H NMR (500 MHz, DMSOd₆): δ ppm 4.31 (s, 1 H), 4.26 (s, 4H), 3.71-3.58 (m, 2H), 3.36 (m, 1 H), 2.60-2.51 (m, 4H), 2.13 (s, 1 H), 0.86 (d, J=46.9 Hz, 6H). ¹³C NMR (125 MHz, DMSO-d₆): δ ppm 172.7, 172.3, 169.5, 62.4, 59.6, 45.5, 35.6, 33.0, 27.3, 19.8, 19.0.

Example 16

The purpose of this example is to illustrate the preparation of Polyethylene1-carboxy-sec-butyl pyrrolidone carboxylic acid (PE-sec-BPPC):

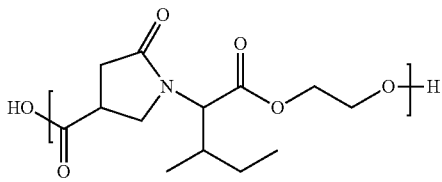

2.433 g (10.0 mmol) of 1-carboxy-iso-propyl pyrrolidone carboxylic acid, 0.745 g (12.0 mmol) of ethylene glycol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 84% yield. ¹H NMR (500 MHz, DMSOd₆): δ ppm 4.42 (s, 1 H), 4.31 (m, 4H), 3.72-3.53 (m, 2H), 3.35 (m, 1H), 2.61-2.51 (m, 4H), 1.95 (s, 1H), 1.35 (s, 1H), 1.14-1.12 (m, 1H), 0.86 (d, J=30.3 Hz, 6H). ¹³C NMR (125 MHz, DMSO-d₆): δ ppm 172.7, 172.3, 169.6, 62.4, 58.0, 45.6, 35.6, 33.0, 25.4, 24.1, 15.1, 10.29.

Example 17

The purpose of this example is to illustrate the preparation of Polyethylene1-carboxy-iso-butyl pyrrolidone carboxylic acid (PE-iso-BPPC):

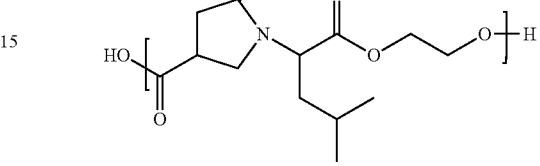

2.433 g (10.0 mmol) of 1-carboxy-sec-propyl pyrrolidone carboxylic acid, 0.745 g (12.0 mmol) of ethylene glycol and 58.3 mg (2.0 mol %) Sb2O3 were added to a 25 mL round bottom flask and melted under a nitrogen atmosphere at 180° C. for 4 hours. Then dynamic vacuum was slowly introduced into the system to increase the reaction rate by removing byproduct (water) from the system and help shift the equilibrium to completion. The temperature was steadily increased from 180° C. to 240° C. over a period of 8 hours. After cooling down, the polymer was melted and removed without further purification, giving a brown polymer in 84% yield. ¹H NMR (500 MHz, DMSOd₆): δ ppm 4.66 (s, 1 H), 4.30 (s, 4H), 3.70-3.56 (m, 2H), 3.37 (m, 1 H), 2.60-2.51 (m, 4H), 1.74-1.45 (m, 3H), 0.88 (d, J=35.3 Hz, 6H). ¹³C NMR (125 MHz, DMSO-d₆): δ ppm 172.6, 172.4, 170.5, 62.3, 51.3, 45.1, 36.5, 35.4, 33.0, 24.1, 22.8, 20.8.

Examples 18-26

Itaconic acid (99%) was purchased from Alfa Aesar and used without further purification. L-phenylalanine was purchased from BulkSupplements on Amazon and used as received. 1,3-propanediol (99.5%), 1,4-butanediol (99.5%), 1,5-pentanediol (99.5%), 1,8-octanediol (99%), 1,9-nonanediol (99%), 1,4-xylylenediamine (99.5%) were purchased from Sigma-Aldrich and used as received. Antimony Oxide (5b203, 99.5%), the catalyst for polymerization, 1,4-phenylenediamine (99%) and 1,10-decanediol (99%) were purchased from Acros and used as received without any purification. 1,6-hexanediol (98%) was bought from Avocado and recrystallized in Ethyl Acetate. Ethylene glycol, Methanol, Ethanol and Ethyl Acetate were purchased from Fisher Scientific. NMR solvents, including deuterated dimethyl sulfoxide (DMSO-d6) and deuterium oxide (D2O), were purchased from Cambridge Isotope Laboratories. All other chemicals, unless expressly mentioned, were utilized as received.

Proton and carbon nuclear magnetic resonance (¹H and ¹³C NMR) spectra were recorded using an Inova 500 MHz spectrometer. Chemical shifts are reported in parts per million (ppm) downfield relative to tetramethylsilane (TMS, 0.0 ppm) or residual proton and carbon in the specified solvent. Coupling constants (J) are reported in Hertz (Hz). Multiplicities are reported using the following abbreviations: s, singlet; d, doublet; t, triplet; q, quartet; quin, quintet; m, multiplet; br, broad.

Differential scanning calorimetry thermograms were obtained with a DSC Q1000 from TA instruments. About 3-5 mg of each sample were massed and added to a sealed pan that passed through a heat/cool/heat cycle at 10° C./min. Reported data are from the second full cycle. The temperature ranged from −50 to 200° C., depending on the samples.

Thermogravimetric analyses were measured under nitrogen with a TGA Q5000 from TA Instruments. About 5-10 mg of each sample were heated at 20° C./min from 25 to 600° C.

Gel permeation chromatography (GPC) was performed at 40° C. using an

Agilent Technologies 1260 Infinity Series liquid chromatography system with an internal differential refractive index detector, and a PL HFIP gel column (7.5 mm i.d., 300 mm length) using a solution of 0.1% potassium triflate (K(OTf)) in HPLC grade hexafluoroisopropanol (HFIP) as the mobile phase at a flow rate of 0.3 mL min-1. Calibration was performed with narrow polydispersity polymethyl methacrylate (PMMA) standards.

Tensile testing was carried out with an Instron 5966 universal testing system containing a 2 kN load cell. Dogbone-shaped testing bars (ASTM D638, bar type 5, thickness 1.5 mm) were prepared following the curing protocol described above. Pneumatic grips (maximum force 2 kN) were used to affix the sample in the testing frame, at a compressed air pressure of 60 psi. The force and change in length were measured as the sample was elongated at a rate of 10 mm/min. The engineering stress was calculated using the measured force and cross-sectional area of the sample. The engineering strain was measured using the travel distance of the frame. Each tensile measurement was repeated with 5 test specimens that broke in the gauge region and did not contain a visible macroscopic defect (voids, bubbles, etc) at the point of fracture.

The polymerizations were usually performed in a 25 mL round bottom flask, which was connected to a rotary evaporation bump trap, and together linked to a vacuum line. With this setup water, as the byproduct of condensation, can be collected and seen in the bump trap. Furthermore, all other volatile compounds could be removed without further treatment.

Example 18

The purpose of this example is to illustrate the preparation of the monomer, 1,4-phenylene bis(pyrrolidone carboxylic acid) (PBPCA):

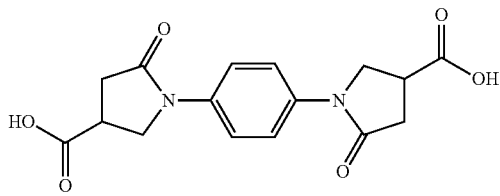 [SMILES: O=C(O)C1CC(=O)N(c2ccc(N3CC(C(=O)O)CC3=O)cc2)C1]

13.01 g (100.0 mmol) of itaconic acid and 5.95 g (55.0 mmol) of 1,4-phenylenediamine were dissolved in 100 mL of water. The mixture was refluxed overnight and cooled down to room temperature. The system was stored in fridge overnight and purple product started to precipitate. 1 M of NaOH solution was added to dissolve the crude. 5 g of active charcoal was introduced and vigorous agitation was applied for 1 hour before filtering out the charcoal. An excess amount of HCl aqueous solution was added to regenerate the product. The off-white powder was obtained after washing with water, filtered and dried, affording a yield of 66%. $^1$H NMR (500 MHz, DMSO-$d_6$): δ ppm 12.77 (br, 2H), 7.65 (s, 2H), 4.04 (t, J=9.03 Hz, 1 H), 3.96 (dd, J=9.3, 10.4 Hz, 1 H), 3.39-3.34 (m, 1 H), 2.77-2.70 (m, 2H). $^{13}$C NMR (125 MHz, DMSOd$_6$): δ ppm 174.2, 171.6, 135.3, 119.7, 50.0, 39.4, 35.2.

Example 19

The purpose of this example is to illustrate the preparation of the monomer, 1,4-xylylene bis(pyrrolidone carboxylic acid) (XBPCA):

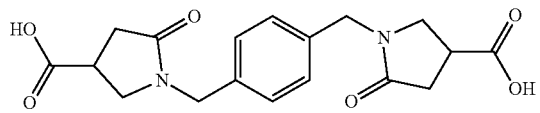 [SMILES: O=C(O)C1CC(=O)N(Cc2ccc(CN3CC(C(=O)O)CC3=O)cc2)C1]

13.01 g (100.0 mmol) of itaconic acid and 7.53 g (55.0 mmol) of 1,4-xylylenediamine were dissolved in 100 mL of water. The mixture was refluxed overnight and cooled down to room temperature. After removing most of the solvent by rotary evaporation, ethanol was added and a white product started to precipitate. After filtration, the raw product was recrystallized in ethanol and dried under vacuum with a yield of 70%. $^1$H NMR (500 MHz, DMSO-$d_6$): δ ppm 12.62 (br, 2H), 7.20 (s, 2H), 4.41-4.31 (m, 2H), 3.46 (t, J=9.2 Hz, 1 H), 3.38 (dd, J=9.0, 9.8 Hz, 1 H) 3.25-3.19 (m, 1 H), 2.62 -2.49 (m, 2H). $^{13}$C NMR (125 MHz, DMSO-$d_6$): δ ppm 174.5, 172.1, 135.7, 127.8, 48.4, 45.1, 35.3, 33.5.

Example 19

The purpose of this example is to illustrate the preparation of the monomer, N-(2-carboxylphenyl)-2-pyrrolidone-4-carboxylic acid (CPPCA):

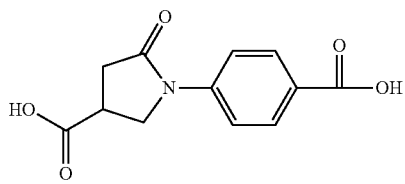 [SMILES: O=C(O)c1ccc(N2CC(C(=O)O)CC2=O)cc1]

13.01 g (100.0 mmol) of itaconic acid and 13.71 g (100.0 mmol) of 1,4-aminobenzoic acid were dissolved in 100 mL of water. The mixture was refluxed overnight under inert atmosphere. While cooling down to room temperature, while product started to precipitate. Solvent was filtered and an overnight trituration in THF was conducted. The white powder was obtained by vacuum filtration and dried under reduced pressure, affording a yield of 75%. $^1$H NMR (500 MHz, DMSO-$d_6$): δ ppm 12.87 (br, 2H), 7.94 (d, J=8.8 Hz, 2H), 7.81 (d, J=8.8 Hz, 2H), 4.10 (t, J=9.3 Hz, 1H), 4.02 (dd, J=9.3, 10.0 Hz, 1 H) 3.40-3.34 (m, 1 H), 2.86-2.72 (m, 2H). $^{13}$C NMR (125 MHz, DMSO-$d_6$): δ ppm 174.1, 172.5, 166.8, 142.9, 130.1, 125.7, 118.4, 49.8, 35.3, 35.0.

Example 20

The purpose of this example is to illustrate the preparation of the monomer, 1-carboxyphenylethyl pyrrolidone carboxylic acid (CPEPCA):

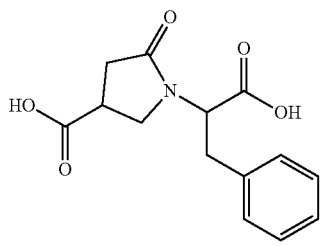 [SMILES: O=C(O)C1CC(=O)N(C(Cc2ccccc2)C(=O)O)C1]

1.301 g (10.0 mmol) of itaconic acid and 0.891 g (10.0 mmol) of L-phenylalanine were charged in a 25 ml round bottle flask under Nitrogen atmosphere with continuous stirring. The mixture was heat up to 130° C. for 6 hours. After reaction completed, the system was subjected to dynamic vacuum for half an hour before cooling down. 20 mL Ethyl Acetate was added to the yellow crude and triturated overnight. White precipitant formed and vacuum filtration was conducted. The obtained solid was washed with 10 mL of Diethyl Ether three times. White powder was eventually collected and dried under vacuum with a yield of 70%. $^1$H NMR (500 MHz, DMSO-$d_6$): δ ppm 12.80 (br, 2H), 7.26-7.19 (m, 5H), 4.79-4.75 (m, 1 H), 3.62 (t, J=9.4 Hz, 1 H), 3.53 (dd, J=9.8, 6.1 Hz, 1 H), 3.22 (t, J=7.3 Hz, 1 H), 3.22-3.14 (m, 1 H), 3.03-2.98 (m, 1 H), 2.47-2.29 (m, 2H). $^{13}$C NMR (125 MHz, DMSO-$d_6$): δ ppm 174.2, 172.5, 172.3, 49.0, 45.6, 35.6, 33.4, 14.5.

Example 21

The purpose of this example is to illustrate the preparation of Polypropylene N-(2-carboxylphenyl)-2-pyrrolidone-4-carboxylate (PPCPPC):

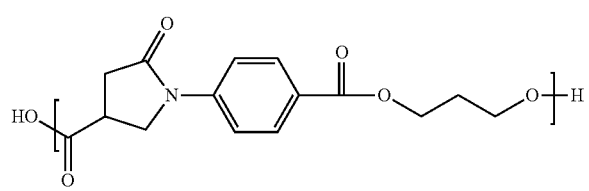

2.492 g (10.0 mmol) of 1-carboxyethyl pyrrolidone carboxylic acid, 0.837 g (11.0 mmol) of 1,3-propanediol and 58.3 mg (2.0 mol %) Sb2O3 were added to a 25 mL round bottom flask and melted under a nitrogen atmosphere at 200° C. for 4 hours. The temperature was elevated to 220° C. for another 4 hours. Then dynamic vacuum was slowly introduced into the system to increase the reaction rate by removing byproduct (water) from the system and help shift the equilibrium to completion. The temperature was steadily increased from 220° C. to 240° C. over a period of 8 hours. After cooling down, the polymer was melted and removed without further purification, giving a brown polymer in 90% yield. $^1$H NMR (500 MHz, DMSO-$d_6$): δ ppm 7.92 (s, 2H), 7.75 (s, 2H), 4.40 (br, 4H), 4.10-4.02 (m, 1H), 4.00-3.93 (m, 1H), 3.46 (s, 1 H), 2.86-2.73 (m, 2H), 2.06 (br, 2H). $^{13}$C NMR (125 MHz, DMSO-$d_6$): δ ppm 172.4, 172.2, 165.3, 143.1, 130.0, 124.6, 118.4, 61.9, 61.4, 49.5, 35.1, 34.9, 27.5.

Example 22

The purpose of this example is to illustrate the preparation of Polybutylene N-(2-carboxylphenyl)-2-pyrrolidone-4-carboxylate (PBCPPC):

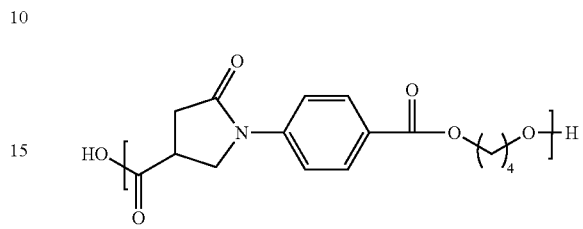

2.492 g (10.0 mmol) of 1-carboxyethyl pyrrolidone carboxylic acid, 0.991 g (11.0 mmol) of 1,4-butanediol and 58.3 mg (2.0 mol %) Sb2O3 were added to a 25 mL round bottom flask and melted under a nitrogen atmosphere at 200° C. for 4 hours. The temperature was elevated to 220° C. for another 4 hours. Then dynamic vacuum was slowly introduced into the system to increase the reaction rate by removing byproduct (water) from the system and help shift the equilibrium to completion. The temperature was steadily increased from 220° C. to 240° C. over a period of 8 hours. After cooling down, the polymer was melted and removed without further purification, giving a brown polymer in 90% yield. $^1$H NMR (500 MHz, DMSO-$d_6$): δ ppm 7.93 (s, 2H), 7.78 (s, 2H), 4.26 (br, 4H), 4.11(s, 1 H), 4.00 (m, 1 H), 3.47 (s, 1H), 2.88-2.74 (m, 2H), 1.76 (br, 4H). $^{13}$C NMR (125 MHz, DMSO-$d_6$): δ ppm 172.4, 172.2, 165.2, 143.0, 129.9, 124.8, 118.4, 64.4, 64.1, 49.5, 35.1, 34.9, 24.6, 24.4.

Example 23

The purpose of this example is to illustrate the preparation of Polypentylene N-(2-carboxylphenyl)-2-pyrrolidone-4-carboxylate (PPeCPPC):

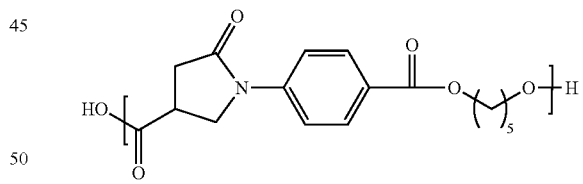

2.492 g (10.0 mmol) of 1-caboxyethyl pyrrolidone carboxylic acid, 1.094 g (10.5 mmol) of 1,5-heptanediol and 58.3 mg (2.0 mol %) Sb2O3 were added to a 25 mL round bottom flask and melted under a nitrogen atmosphere at 200° C. for 4 hours. The temperature was elevated to 220° C. for another 4 hours. Then dynamic vacuum was slowly introduced into the system to increase the reaction rate by removing byproduct (water) from the system and help shift the equilibrium to completion. The temperature was steadily increased from 220° C. to 240° C. over a period of 8 hours. After cooling down, the polymer was melted and removed without further purification, giving a brown polymer in 90% yield. $^1$H NMR (500 MHz, DMSO-$d_6$): δ ppm 7.90 (s, 2H), 7.75 (s, 2H), 4.19 (br, 4H), 4.05(s, 1 H), 3.96 (m, 1 H), 3.43 (s, 1 H), 2.88-2.74 (m, 2H), 1.73-1.32 (M, 6H). $^{13}$C NMR (125 MHz, DMSO-d$_6$): δ ppm 172.4, 172.2, 165.2, 143.0, 129.9, 124.8, 118.4, 64.5, 64.2, 49.5, 35.1, 34.9, 27.7, 27.6, 24.6.

Example 24

The purpose of this example is to illustrate the preparation of Polyhexylene N-(2-carboxylphenyl)-2-pyrrolidone-4-carboxylate (PHCPPC):

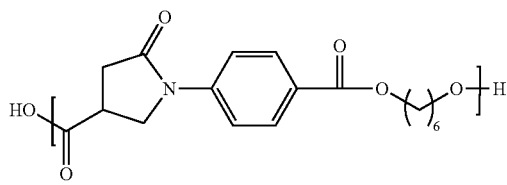

2.492 g (10.0 mmol) of 1-carboxyethyl pyrrolidone carboxylic acid, 1.241 g (10.5 mmol) of 1,6-hexanediol and 58.3 mg (2.0 mol %) Sb2O3 were added to a 25 mL round bottom flask and melted under a nitrogen atmosphere at 200° C. for 4 hours. The temperature was elevated to 220° C. for another 4 hours. Then dynamic vacuum was slowly introduced into the system to increase the reaction rate by removing byproduct (water) from the system and help shift the equilibrium to completion. The temperature was steadily increased from 220° C. to 240° C. over a period of 8 hours. After cooling down, the polymer was melted and removed without further purification, giving a brown polymer in 90% yield. 1H NMR (500 MHz, DMSO-d6): δ ppm 7.91 (s, 2H), 7.76 (s, 2H), 4.20 (br, 4H), 4.05(s, 1 H), 3.97 (m, 1 H), 3.43 (s, 1 H), 2.81-2.71 (m, 2H), 1.68-1.27 (M, 6H). 13C NMR (125 MHz, DMSO-d6): δ ppm 172.4, 172.2, 165.2, 143.0, 129.9, 124.8, 118.4, 64.5, 64.2, 49.5, 35.1, 34.9, 28.2, 27.8, 25.1, 24.9.

Example 25

The purpose of this example is to illustrate the preparation of Polyoctylene N-(2-carboxylphenyl)-2-pyrrolidone-4-carboxylate (POCPPC):

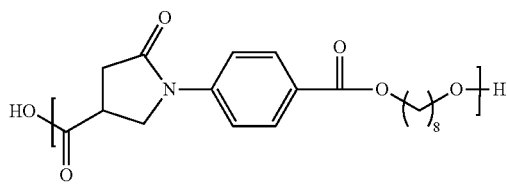

2.492 g (10.0 mmol) of 1-carboxyethyl pyrrolidone carboxylic acid, 1.609 g (11.0 mmol) of 1,8-octanediol and 58.3 mg (2.0 mol %) Sb2O3 were added to a 25 mL round bottom flask and melted under a nitrogen atmosphere at 200° C. for 4 hours. The temperature was elevated to 220° C. for another 4 hours. Then dynamic vacuum was slowly introduced into the system to increase the reaction rate by removing byproduct (water) from the system and help shift the equilibrium to completion. The temperature was steadily increased from 220° C. to 240° C. over a period of 8 hours. After cooling down, the polymer was melted and removed without further purification, giving a brown polymer in 90% yield. $^1$H NMR (500 MHz, CDCl3-d1): δ ppm 7.91 (s, 2H), 7.76 (s, 2H), 4.20 (br, 4H), 4.04 (s, 1 H), 3.97 (m, 1 H), 3.43 (s, 1 H), 2.81-2.71 (m, 2H), 1.74-1.33 (M, 6H). $^{13}$C NMR (125 MHz, CDCl3-d1): δ ppm 172.4, 172.2, 165.2, 143.0, 129.9, 124.8, 118.4, 64.5, 64.2, 49.5, 35.6, 35.5, 29.2, 29.0, 28.6, 28.4, 25.8, 25.6.

Example 26

The purpose of this example is to illustrate the preparation of Polydecanylene N-(2-carboxylphenyl)-2-pyrrolidone-4-carboxylate (PDCPPC):

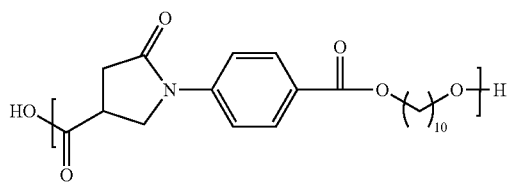

2.492 g (10.0 mmol) of 1-carboxyethyl pyrrolidone carboxylic acid, 1.743 g (10.0 mmol) of 1,10-decanediol and 58.3 mg (2.0 mol %) Sb2O3 were added to a 25 mL round bottom flask and melted under a nitrogen atmosphere at 200° C. for 4 hours. The temperature was elevated to 220° C. for another 4 hours. Then dynamic vacuum was slowly introduced into the system to increase the reaction rate by removing byproduct (water) from the system and help shift the equilibrium to completion. The temperature was steadily increased from 220° C. to 240° C. over a period of 8 hours. After cooling down, the polymer was melted and removed without further purification, giving a brown polymer in 90% yield. $^1$H NMR (500 MHz, CDCl3-d1): δ ppm 8.02 (s, 2H), 7.69 (s, 2H), 4.29 (br, 4H), 4.15 (s, 1H), 4.06 (m, 1H), 3.36 (s, 1H), 2.94-2.81 (m, 2H), 1.74-1.31 (M, 12H). $^{13}$C NMR (125 MHz, CDCl3-d1): δ ppm 172.4, 172.3, 165.2, 142.7, 130.5, 126.4, 118.9, 65.6, 65.1, 50.2, 35.9, 35.7, 29.5, 29.5, 29.3, 29.3, 29.2, 28.8 28.5, 25.9.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5.0%" should be interpreted to include not only the explicitly recited concentration of about 0.1 wt % to about 5.0 wt %, but also include individual concentrations (e.g., 1.0%, 2.0%, 3.0%, and 4.0%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of this disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A co-polymer, having a glass transition temperature of about 50° C. or greater, the co-polymer comprising: a plurality of first monomeric units and a plurality of second monomeric units joined by a plurality of hydrolytically-sensitive ester linkages,
wherein each of the plurality of first monomeric units is derived from a first monomer,
wherein the first monomer is the product of a reaction between itaconic acid and a first amino acid,
wherein each of the plurality of second monomeric units is derived from a second monomer,
wherein the second monomer is the product of a reaction between itaconic acid and a second amino acid, and
wherein the co-polymer is a product of the reaction of the first monomer and the second monomer in the presence of a diol.

2. The co-polymer of claim 1, wherein the first amino acid is substituted or unsubstituted para-aminobenzoic acid.

3. The co-polymer of claim 1, wherein the second amino acid is a natural or non-natural substituted or unsubstituted aliphatic amino acid.

4. The co-polymer of claim 1, wherein the second amino acid is glycine.

5. The co-polymer of claim 1, wherein the diol is a 1,3-diol, a 1,4-diol, or a-1,5 diol.

6. The co-polymer of claim 1, wherein the diol is 1,3-propanediol.

7. The co-polymer of claim 1, wherein 94% or more of the plurality of hydrolytically-sensitive ester linkages are hydrolyzed after one year of exposure to water.

8. The co-polymer of claim 1, wherein the first monomeric unit and the second monomeric unit are present in a 1:1 ratio.

9. The co-polymer of claim 1, wherein the first monomeric unit and the second monomeric unit are present in a ratio that is not 1:1.

10. The co-polymer of claim 1, wherein the first amino acid is para-aminobenzoic acid and the second amino acid is glycine.

11. The co-polymer of claim 1, wherein the first amino acid is para-aminobenzoic acid, the second amino acid is glycine, and the diol is 1,3-propanediol.

12. A co-polymer, comprising a first repeating unit having a structure according to formula I:

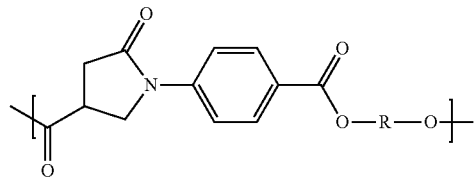

and a second repeating unit, having a structure according to formula II:

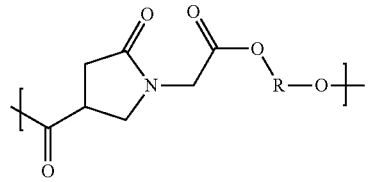

wherein R is a $C_1$ to $C_6$ aliphatic group;
wherein the co-polymer has a glass transition temperature of about 50° C. or greater.

13. The co-polymer of claim 12, wherein the first repeating unit and second repeating unit are present in a 1:1 ratio.

14. The co-polymer of claim 12, wherein the first repeating unit and second repeating unit are present in a ratio that is not 1:1.

15. The co-polymer of claim 12, wherein the first repeating unit and the second repeating unit are joined by a hydrolytically-sensitive ester linkage.

16. The co-polymer of claim 15, wherein 94% or more of the hydrolytically-sensitive ester linkages are hydrolyzed after one year of exposure to water.

17. A method of producing a co-polymer, having a glass transition temperature of about 50° C. or greater, the method comprising: reacting a first monomer and a second monomer in the presence of a diol,
wherein the first monomer is the product of a reaction between itaconic acid and a first amino acid;
wherein the second monomer is the product of a reaction between itaconic acid and a second amino acid; and
wherein, in the co-polymer, the first monomer and second monomer are joined by a hydrolytically-sensitive ester linkage.

18. The method of claim 17, wherein 94% or more of the hydrolytically-sensitive ester linkages are hydrolyzed after one year of exposure to water.

* * * * *